United States Patent [19]

Lirones

[11] Patent Number: 4,697,632
[45] Date of Patent: Oct. 6, 1987

[54] CERAMIC POROUS BODIES SUITABLE FOR USE WITH SUPERALLOYS

[75] Inventor: Nick G. Lirones, North Muskegon, Mich.

[73] Assignee: Howmet Turbine Components Corporation, Greenwich, Conn.

[21] Appl. No.: 387,708

[22] Filed: Jun. 11, 1982

[51] Int. Cl.$^4$ .......................... B22C 9/10; C21B 7/06; B01D 39/20; C04B 38/00

[52] U.S. Cl. .................................. 164/369; 164/516; 210/496; 210/510.1; 249/142; 264/44; 264/60; 264/62; 264/221; 264/DIG. 44; 266/275; 266/280

[58] Field of Search ...................... 264/44, 86, 60, 221, 264/62, DIG. 44; 249/142; 266/275, 280; 210/496, 510.1; 164/369, 516

[56] References Cited

U.S. PATENT DOCUMENTS

| | | | |
|---|---|---|---|
| 2,961,751 | 11/1960 | Operhall | 22/196 |
| 2,994,931 | 8/1961 | Operhall | 22/158 |
| 3,011,986 | 12/1961 | Operhall | 260/17.4 |
| 3,090,094 | 5/1963 | Schwartzwolder | 25/156 |
| 3,097,930 | 7/1963 | Holland | 25/156 |
| 3,111,396 | 11/1963 | Burton | 25/156 |
| 3,196,506 | 7/1965 | Operhall | 22/196 |
| 3,511,689 | 5/1970 | Winkler | 117/70 |
| 3,540,884 | 11/1970 | Horbury | 75/211 |
| 3,809,146 | 5/1974 | Andrzajak | 164/66 |
| 3,877,973 | 4/1975 | Ravault | 264/44 |
| 3,893,917 | 7/1975 | Pryor | 210/69 |
| 3,947,363 | 3/1976 | Pryor | 210/510 |
| 3,950,460 | 4/1976 | Mastrangelo | 264/44 |
| 3,981,352 | 9/1976 | Nurminen | 164/358 |
| 4,024,056 | 5/1977 | Yarwood | 210/69 |
| 4,067,731 | 1/1978 | Chia | 75/68 R |
| 4,092,153 | 5/1978 | Yarwood | 75/68 R |
| 4,139,184 | 2/1979 | Griffith | 266/220 |
| 4,177,065 | 12/1979 | Clumpner | 75/93 E |
| 4,298,187 | 11/1981 | Dantzig | 266/217 |

OTHER PUBLICATIONS

Stauffer brochures: "*Victawet*", Stauffer Chemical Co., Specialty Chemical Division, Westport, Conn., c1979, 3 pp.

R. T. Vanderbilt brochures: *Darvan No. 7 Technical Data* Norwalk, Conn., R. T. Vanderbilt Co., Feb. 15, 1977, 6 pp.

Alcoa brochure: *Product Data: Calcined Aluminas,* Pittsburgh, Pa., Aluminum Company of America, Alcoa Chemicals Division, Apr., 1982, 4 pp.

*Primary Examiner*—Philip Anderson
*Attorney, Agent, or Firm*—Finnegan, Henderson, Farabow, Garrett & Dunner

[57] ABSTRACT

Ceramic porous bodies, including ceramic foam filters and smooth-faced ceramic objects, e.g., ceramic foam bricks, ceramic foam melting crucibles, and ceramic foam cores, made in accordance with the present invention are suitable for use with molten metal in general and molten superalloys in particular. The invention also provides a tundish for use with ceramic foam filters to filter metal en route from a metal furnace to a casting mold, and a melting device for use in casting metal which employs a ceramic foam filter as a bottom pour valve for a melting crucible such that the ceramic foam filter valve regulates the flow of molten metal therethrough in order to permit an entire ingot of metal to melt in the melting crucible before any metal begins to pour from the melting device into a casting mold.

66 Claims, 26 Drawing Figures

CERAMIC FOAM BRICK

CERAMIC FOAM MELTING CRUCIBLE

CERAMIC POROUS BODIES SUITABLE FOR USE WITH SUPERALLOYS

BACKGROUND OF THE INVENTION

The present invention relates to ceramic porous bodies in general and "ceramic foam filters" in particular. A "ceramic foam filter" is a filter particularly useful in the filtering of molten metal, which is made by immersing a polyurethane foam pattern into a ceramic slurry, removing excess slurry from the polyurethane foam pattern, and firing the polyurethane foam pattern to burn away the organic matter and thereby create a porous, hard, self-sustaining ceramic article.

Ceramic foam filters have been known for at least about twenty years. They were described almost simultaneously in U.S. Pat. Nos. 3,090,094 (Schwartzwalder et al.), 3,097,930 (Holland), and 3,111,396 (Ball). Since then a number of companies have worked to develop ceramic foam filters for use in the filtering of aluminum, copper, and other metals having a melting point of less than 1200° C. Companies doing work in this field have included Swiss Aluminium Limited of Switzerland (U.S. Pat. Nos. 3,893,917, 3,947,363, 3,962,081, 4,024,056, and 4,081,371) and the Bridgestone Tire Company Limited of Japan (U.S. Pat. Nos. 4,257,810 and 4,258,099). Heretofore, however, there has not been available a ceramic foam filter which is suitable for use with superalloys, i.e., metals having melting points in excess of 1200° C. In fact, prior to the development of the present invention several attempts were made to use presently available ceramic foam filters with superalloys but these efforts were unsuccessful.

SUMMARY OF THE INVENTION

It is, therefore, a main object of the present invention to provide ceramic porous bodies in general and ceramic foam filters in particular which overcome the above-mentioned drawback.

It is a more specific object of the present invention to provide ceramic porous bodies in general and ceramic foam filters in particular which are suitable for use with superalloys.

A further object of this invention is to provide ceramic porous bodies in general and ceramic foam filters in particular which are superior to prior art ceramic objects in general and ceramic foam filters in particular used with metals having melting points below 1200° C., such as aluminum and copper.

Another object of this invention is to provide a tundish particularly suitable for use with a ceramic foam filter in the filtering of molten metal en route from an alloy furnace to an ingot mold.

An additional object of this invention is to provide a process for simultaneously filtering and casting molten metal.

A still further object of this invention is to provide a melting device for use in air or vacuum melting of an ingot of metal which utilizes a ceramic foam filter valve to permit an entire ingot of metal to melt before any metal is poured from the melting device.

An additional object of this invention is to provide ceramic porous bodies having one or more solid, high density, high purity, smooth faces for use as: insulating refractory linings for furnaces, kilns and ladles; melting crucibles; ceramic cores; and other similar objects.

Additional objects and advantages of the invention will be set forth in part in the description which follows, and in part will be obvious from the description, or may be learned by practice of the invention. The objects and advantages of the invention may be realized and obtained by means of instrumentalities and combinations particularly pointed out in the appended claims.

To achieve the objects, and in accordance with the purpose of the invention, as embodied and broadly described herein, the invention comprises a process for making a ceramic porous body suitable for use with molten metals in general and molten superalloys in particular which comprises the steps of: providing an open-cell, flexible foam pattern; impregnating the foam pattern with a ceramic slurry; burning out the foam pattern at a temperature of between 1400° F. and 2200° F. to form a ceramic substrate; impregnating the ceramic substrate with additional ceramic slurry; and firing the impregnated ceramic substrate at a temperature of between 2200° F. and 3400° F.

To further achieve the objects, and in accordance with the purpose of the invention, as embodied and broadly described herein, the invention comprises a ceramic porous body suitable for use with molten metals in general and molten superalloys in particular made by the process which comprises the steps of: providing an open-cell, flexible foam pattern; impregnating the foam pattern with a ceramic slurry; burning out the foam pattern at a temperature of between 1400° F. and 2200° F. to form a ceramic substrate; impregnating the ceramic substrate with additional ceramic slurry; and firing the impregnated ceramic substrate at a temperature of between 2200° F. and 3400° F.

To further achieve the objects, and in accordance with the purpose of the invention, as embodied and broadly described herein, the invention comprises a ceramic foam filter useful for filtering molten metals in general and molten superalloys in particular made by the process which comprises the steps of: providing an open-cell, flexible foam pattern; impregnating the foam pattern with a ceramic slurry; burning out the foam pattern at a temperature of between 1400° F. and 2200° F. to form a ceramic substrate; impregnating the ceramic substrate with additional ceramic slurry; and firing the impregnated ceramic substrate at a temperature of between 2200° F. and 3400° F.

To further achieve the objects in accordance with the purpose of the invention, as embodied and broadly described herein, the invention comprises a method of filtering molten metals in general and molten superalloys in particular, which comprises the steps of: providing a ceramic foam filter; positioning the ceramic foam filter so that molten metal will pass through the ceramic foam filter when the molten metal is poured; and pouring the molten metal through the ceramic foam filter; wherein the ceramic foam filter is made by the process which comprises the steps of: impregnating an open-cell, flexible foam pattern with a ceramic slurry; burning out the foam pattern at a temperature of between 1400° F. and 2200° F. to form a ceramic substrate; impregnating the ceramic substrate with additional ceramic slurry; and firing the impregnating ceramic substrate at a temperature of between 2200° F. and 3400° F.

To further achieve the objects in accordance with the purpose of the invention, as embodied and broadly described herein, the invention comprises a tundish, for use with a ceramic foam filter to filter molten metal, comprising a monolithic body having a bottom pour draining outlet and means for maintaining a ceramic foam filter in the path of molten metal passing through said tundish to said draining outlet.

To further achieve the objects in accordance with the purpose of the invention as embodied and broadly described herein, the invention comprises a melting device for use in air or vacuum melting of an ingot of metal, the device comprising a monolithic crucible having a bottom pore outlet and a ceramic foam filter valve adapted to be fitted into the bottom pore outlet; the length, the thickness, the diameter, the ceramic composition, and the pore size of the ceramic foam filter valve being selected to control the flow of metal through the ceramic foam filter valve such that in operation an entire ingot of metal may be allowed to melt in the crucible before any metal begins pouring from the melting device.

To further achieve the objects in accordance with the purpose of the invention, as embodied and broadly described herein, the invention comprises a process for making a ceramic porous body suitable for use with molten metals in general and molten superalloys in particular having a solid, high density, high purity, smooth face which comprises the steps of: providing an open-cell, flexible, foam pattern, and a face pattern the size and shape of a face of the foam pattern to be smoothed; coating the face pattern with a ceramic slurry; stuccoing the face pattern with a coarse ceramic material; impregnating the foam pattern with the ceramic slurry; placing the impregnated foam pattern on the coated, stuccoed face pattern such that the impregnated foam pattern and the coated, stuccoed face pattern dry together and become attached; impregnating the attached impregnated foam pattern and coated, stuccoed face pattern with additional ceramic slurry; removing excess dried ceramic down to the edges of the foam pattern; burning out the foam pattern and the face pattern at a temperature of between 1400° F. and 2200° F. to form a ceramic substrate; impregnating the ceramic substrate with additional ceramic slurry; and firing the impregnated ceramic substrate at a temperature of between 2200° F. and 3400° F.

The foregoing and other objects, features, and advantages of the present invention will be made more apparent from the following description of the preferred embodiments.

DESCRIPTION OF THE PREFERRED EMBODIMENTS

Reference will now be made in detail to the present preferred embodiments of the invention.

The process for making a ceramic porous body suitable for use with molten metals in general and molten superalloys in particular in accordance with the present invention comprises the steps of: providing an open-cell, flexible, foam pattern; impregnating the foam pattern with a ceramic slurry; burning out the foam pattern at a temperature of between 1400° F. and 2200° F. to form a ceramic substrate; impregnating the ceramic substrate with additional ceramic slurry; and firing the impregnated ceramic substrate at a temperature of between 2200° F. and 3400° F.

For purposes of the present invention a "flash" type burn-out of the foam at a temperature of between 1400° F. and 2200° F., preferably at about 1800° F., is used to safeguard against fracture of the foam structure that may result if lower temperature foam removal were used. The temperature at which the impregnated ceramic substrate is fired may be between 2200° F. and 3400° F., and is preferably about 3100° F. Burning out the foam pattern and firing the ceramic substrate in this manner greatly strengthens the resulting product.

For purposes of the present invention a wide variety of open-cell flexible foam pattern materials may be used. Suitable materials include polyurethane, polyethylene, polypropylene and graphite. Good results have been obtained with a reticulated, fully open pore, flexible, ester type polyurethane foam material in sizes ranging from 10 to 30 pores per inch.

The ceramic slurry used in accordance with the present invention may vary. Either a single slurry system or a multiple slurry system may be used for the impregnation steps. In either case best results are achieved when the slurry composition and specifications are controlled to obtain optimal slurry impregnation.

Figure 1:
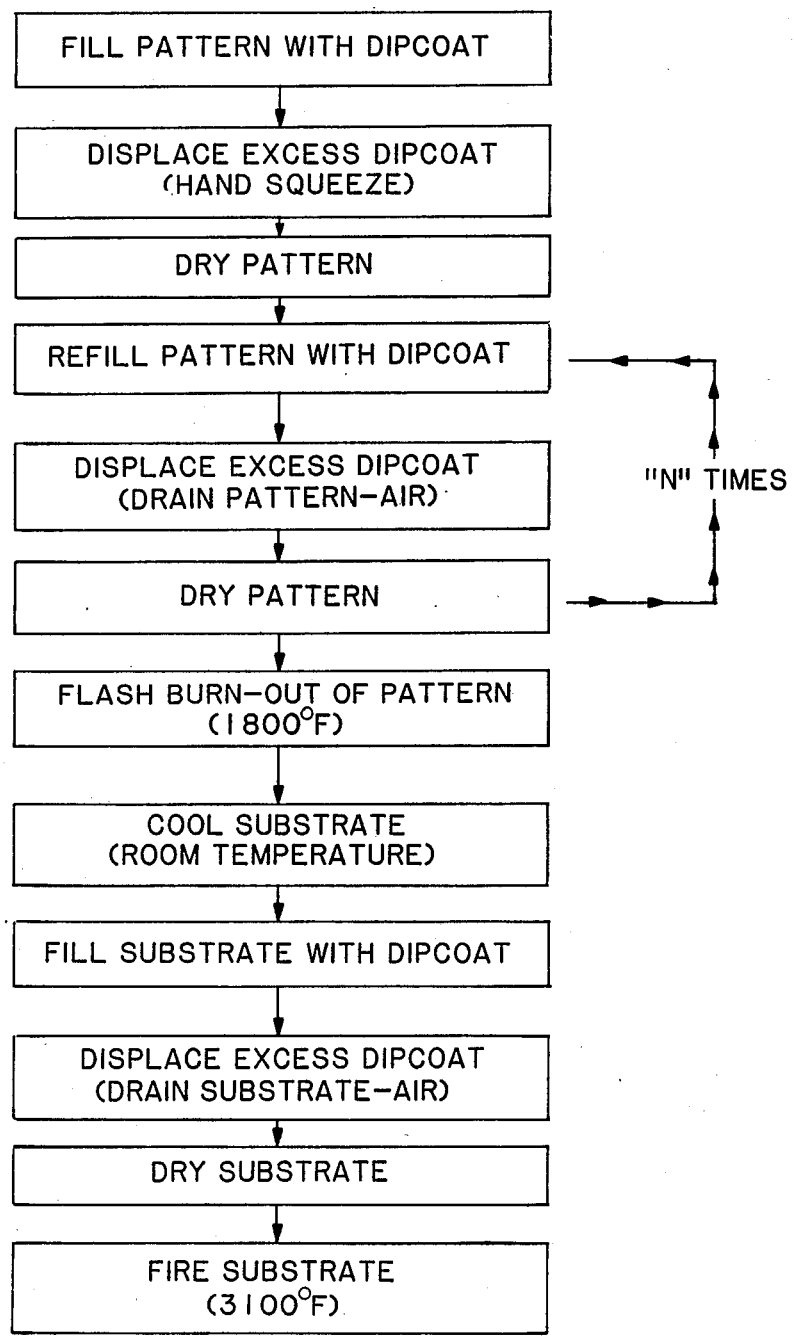
FIG. 1 is a schematic diagram illustrating a preferred embodiment of the process of making ceramic porous bodies of the present invention.

FIG. 1 illustrates a preferred embodiment of the present invention wherein a single slurry system is used for all of the impregnation steps. As embodied herein, a polyurethane foam pattern is first filled with ceramic slurry by dipping the pattern into a ceramic slurry dipcoat. Excess slurry is then displaced from the pattern by squeezing. Compressing the pattern several times by hand is a suitable means for displacing the excess slurry. Other squeezing techniques would also be suitable for this step. Next the pattern is dried. Room temperature drying for a period of between 4 to 6 hours should be sufficient. The pattern is then redipped into the ceramic slurry dipcoat. Excess slurry is then displaced from the pattern *without squeezing*. Preferably, the pattern is allowed to drain in an air stream which serves to breakdown the occasional webs which form between cell walls. Thereafter the pattern is again dried. Room temperature drying for a period of from 4 to 6 hours is suitable here as well. The redipping, draining, and drying step may be repeated. Preferably, these steps are repeated at least once. After the last series of redipping, draining, and drying steps the pattern is allowed to dry preferably at room temperature for 24 hours. After drying, the sides of the pattern may be smoothed with 180 mesh sand paper if desired. Next, the polyurethane foam is burned out at a temperature of between 1400° F. and 2200° F., preferably 1800° F. This may be done by placing the pattern directly on a burn-out tray and holding it in a burn-out furnace for 2 or more hours. After burn-out, the resulting ceramic substrate is cooled preferably to room temperature and then dipped into the ceramic slurry dipcoat again. Excess slurry is then drained from the ceramic substrate preferably by use of an air stream to break down any webs which may have formed between cell walls. The ceramic substrate is then allowed to dry. Drying at room temperature from 4 to 6 hours should be sufficient. Finally, the ceramic substrate is fired at a temperature of between 2200° F. and 3400° F., preferably 3100° F. Good results have been achieved by firing in a zirconia crucible kiln.

For purposes of this invention the ceramic slurry dipcoat used in the embodiment illustrated in FIG. 1 may have a composition of between 1% and 20% silica by weight (dry basis) and between 99% and 80% alumina by weight (dry basis), a viscosity of between 5 and 20 seconds, and a film weight of between 1.0 and 8.0 grams per standard six inch square plate.

Figure 2:
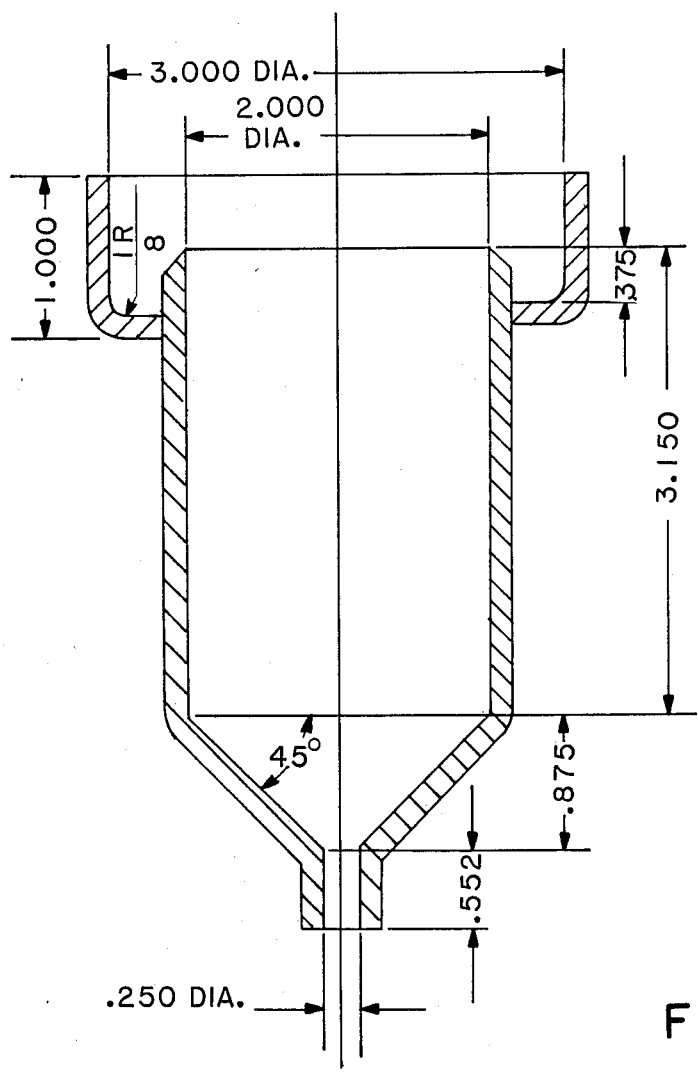
FIG. 2 is a cross-sectional view of a standard viscosity measuring cup used to obtain the values for viscosity reported herein. The dimensions of the viscosity measuring cup are identified.

The values for viscosity reported herein are those which are obtained by measuring the time it takes a ceramic slurry to pass through a viscosity cup having the dimensions of the standard viscosity cup illustrated in FIG. 2.

Figure 3:
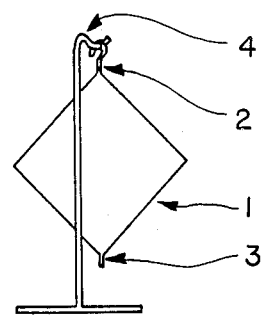
FIG. 3 is a perspective view of apparatus used to obtain the values for ceramic slurry film weight reported herein.

Apparatus for determining a slurry's film weight per standard 6 inch square plate is shown in FIG. 3. The apparatus includes: a 6 inch square by 1/16th inch thick brass plate (1) having a dipping line (2) and a drain boss (3) having a ¾ inch by 3/32 inch diameter, and a plate stand (4) on which the brass plate may be mounted. To measure a ceramic slurry's film weight the following procedure is followed: the plate and stand are weighed; the plate is then dipped into the slurry to be measured up to the dipping line, then placed on the plate stand and allowed to drain until dripping stops (3–4 minutes); and then the wet plate and stand are weighed. The difference between the wet weight and the dry weight equals the film weight of the slurry. The brass plates used in this procedure need to be checked periodically against an unused master, since excessive scratching of the surface will result in too high a weight of retained slurry.

For purposes of this invention, the ceramic slurry dipcoat composition may also include a suspending agent, a wetting agent, and a defoaming agent. Good results have been obtained when polyvinyl chloride latex was used as a suspending agent, VICTAWET, an organic phosphate ester was used as a wetting agent, and ethylhexanol was used as a defoaming agent.

VICTAWET is an organic phosphate ester trademarked wetting agent supplied by the Industrial Chemicals Division of Stauffer Chemical Company. The chemical and physical properties of VICTAWET are listed in Table 1.

TABLE 1

Chemical:
$P_2O_5$ weight percent - 16 min.
Acid #0.1 maximum as mg KOH/g sample
Physical:

| Appearance | Liquid with no more than slight haze. Distinctive odor. |
|---|---|
| Color APHA Standard | 500 max. |
| pH 0.5% solution in water | 7.0–7.4 |

TABLE 1-continued

| | |
|---|---|
| Specific Gravity | 1.110–1.123 |
| Surface tension 0.2% at room temperature | 29.4 dynes cm$^2$ |
| Draves test at 0.2% conc. | 12 seconds |

For purposes of the present invention, the ceramic slurry dipcoat used in the single slurry system embodiment illustrated in FIG. 1 preferably comprises about 9.2 silica by weight (dry basis) and about 90.8% alumina by weight (dry basis), has a viscosity of between 10 and 13 seconds, and a film weight of between 3.7 and 4.0 grams per standard six inch square plate. A suitable source of silica is aqueous colloidal silica and a suitable source of alumina is −325 mesh alumina flour. Table 2 sets forth the slurry composition and specifications of an example of such a ceramic slurry dipcoat with which good results have been obtained.

TABLE 2

| Slurry Composition: | |
|---|---|
| Aqueous Colloidal Silica | 12,800 ml |
| Latex (polyvinyl chloride) | 740 ml |
| Ethylhexanol | 100 ml |
| VICTAWET | 400 ml |
| T-61 (−325 m) Alumina Flour | 100 lb |
| Distilled Water | As required to adjust film weight to 3.7–4.0 g |
| Mix in above order. | |
| Specifications: | |
| Viscosity | = 10–13 sec. |
| Film Wt. | = 3.7–4.0 g. per 6 in. sq. plate |
| Temperature | = 68–75° F. |
| pH | = 8.0–9.5 |
| % SiO$_2$ | = 9.2 (Dry Wt. Basis) |
| % Al$_2$O$_3$ | = 90.8 (Dry Wt. Basis) |

Figure 4:
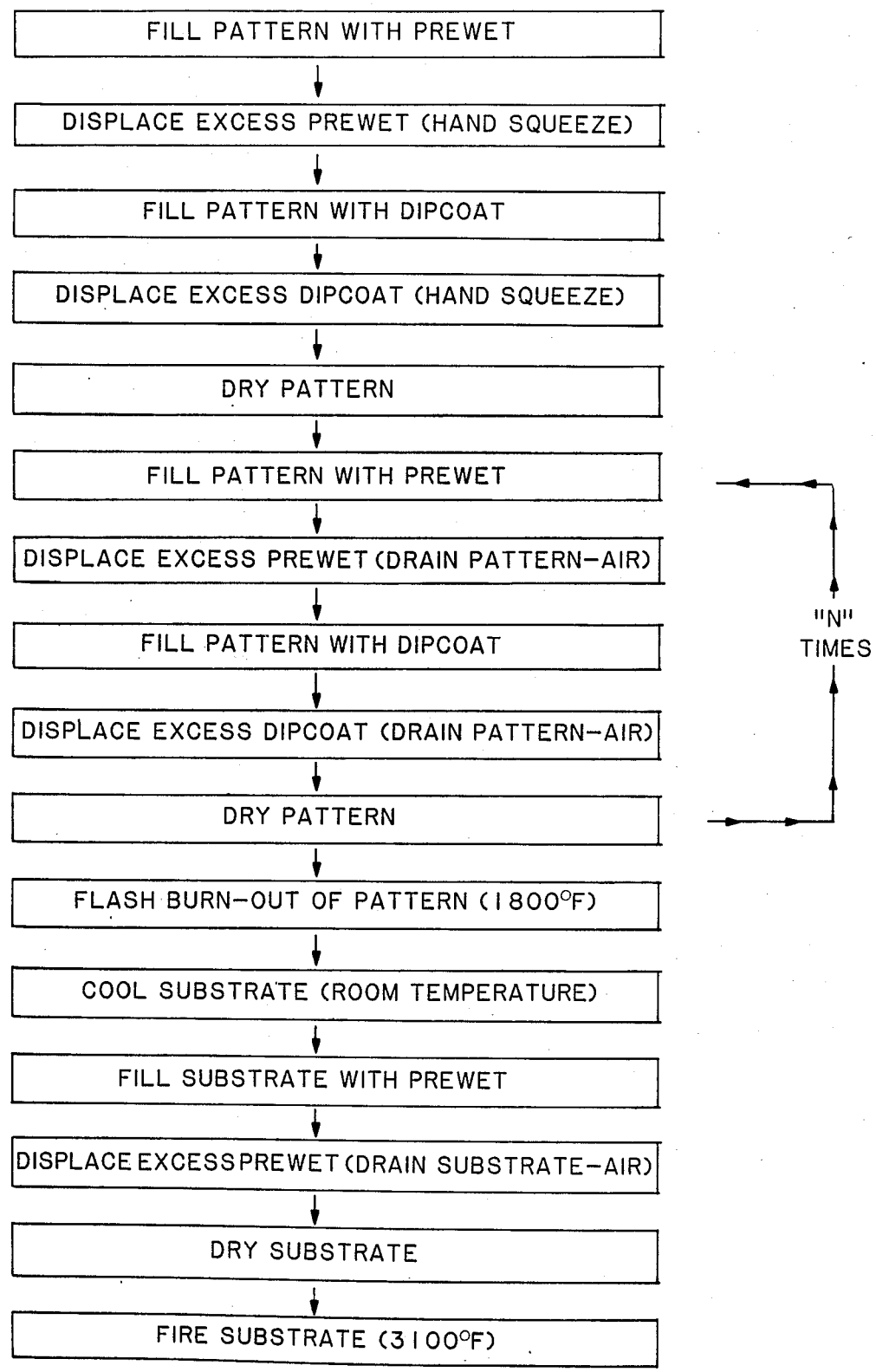
FIG. 4 is a schematic block diagram illustrating another embodiment of the process of making ceramic porous bodies of the present invention.

FIG. 4 illustrates a second embodiment of the present invention. In this embodiment, two different ceramic slurries are used, a ceramic slurry prewet and a ceramic slurry dipcoat. In this second embodiment, the step of impregnating the foam pattern with ceramic slurry is accomplished by dipping the pattern into prewet, draining the pattern by squeezing, dipping the pattern into dipcoat, draining the pattern by squeezing, drying the pattern, redipping the pattern into prewet, draining the pattern without squeezing, redipping the pattern into dipcoat, draining the pattern without squeezing and drying the pattern. The redipping into prewet, draining without squeezing, redipping into dipcoat, draining without squeezing and drying sequence may be repeated, and preferably is repeated at least once. As for the step of impregnating the ceramic substrate with additional ceramic slurry after the burn-out, this is accomplished by dipping the substrate into the pre-wet, draining the substrate, and then drying the substrate. In a variation of this embodiment the prewet alone without the dipcoat is used for the very first dip of the foam pattern. As in the first embodiment, preferably an air stream is employed during draining to break down any webs which may have formed between cell walls.

For purposes of the present invention, the ceramic slurry prewet used in the FIG. 4 embodiment may have a composition of between 1% and 30% silica by weight (dry basis), and between 99% and 70% alumina by weight (dry basis), and a viscosity of between 1 and 25 seconds, and the ceramic slurry dipcoat may have a composition of between 1% and 20% silica by weight (dry basis) and between 99% and 80% alumina by weight (dry basis), a viscosity of between 5 and 60 seconds, and a film weight of between 1.0 and 8.0 grams per standard six inch square plate. Preferably, the ceramic slurry prewet comprises about 11.9% silica by weight (dry basis) and about 88.1% alumina by weight (dry basis) and has a viscosity of between 8 and 10 seconds, and the ceramic slurry dipcoat comprises about 9.2% silica by weight (dry basis) and about 90.8% alumina by weight (dry basis), has a viscosity of between 24 and 30 seconds, and a film weight of between 4.5 and 5.5 grams per standard six inch square plate. A suitable source of silica is aqueous colloidal silica and a suitable source of alumina is −325 mesh alumina flour. Both the ceramic slurry prewet and the ceramic slurry dipcoat may also include a suspending agent, a wetting agent, and a defoaming agent. Preferably, the suspending agent is polyvinyl chloride latex, the wetting agent is VICTAWET, and the defoaming agent is ethylhexanol. Table 3 sets forth the composition and specifications for an example of such a ceramic slurry prewet and a ceramic slurry dipcoat suitable for use in the FIG. 4 embodiment of the present invention.

TABLE 3

| Prewet: | |
|---|---|
| Composition: | |
| Aqueous Colloidal Silica | 17,066 ml |
| Latex (polyvinyl chloride) | 987 ml |
| Ethylhexanol | 130 ml |
| VICTAWET | 130 ml |
| T-61 Alumina Flour (−325 M) | 100 lb |
| Mix in above order. | |
| Specifications: | |
| Viscosity, seconds | 8–10 |
| % Al$_2$O$_3$ = 88.1 (Dry Wt. Basis) | |
| % SiO$_2$ = 11.9 (Dry Wt. Basis) | |
| Dipcoat: | |
| Composition: | |
| Aqueous Colloidal Silica | 12,800 ml |
| Latex | 740 ml |
| Ethylhexanol | 100 ml |
| VICTAWET | 400 ml |
| T-61 Alumina Flour (−325 M) | 100 lb |
| Mix in above order. | |
| Specifications: | |
| Viscosity, seconds | 24–30 |
| Film Wt., g. per 6 in. sq. plate | 4.5–5.5 |
| Temperature °F. | 68–75 |
| pH | 8.0–9.5 |
| % Al$_2$O$_3$ = 90.8 (Dry Wt. Basis) | |
| % SiO$_2$ = 9.2 (Dry Wt. Basis) | |

Alternatively, for purposes of the present invention the ceramic slurry prewet used in the FIG. 4 embodiment may have a composition of between 1% and 30% colloidal silica solids by weight (dry basis) and between 99% and 70% fused silica solids by weight (dry basis), and a viscosity of between 1 and 25 seconds; and the ceramic slurry dipcoat may have a composition of between 1% and 20% colloidal silica solids by weight (dry basis) and between 99% and 80% fused silica solids by weight (dry basis), a viscosity of between 10 and 80 seconds, and a film weight between 1 and 14 grams per standard six inch square plate. Preferably, such a ceramic slurry prewet comprises about 24.8% colloidal silica solids by weight (dry basis) and about 75.2% fused silica solids by weight (dry basis), and has a viscosity of between 6 and 8 seconds; and such a ceramic slurry dipcoat comprises about 12.4% colloidal silica solids by weight (dry basis) and about 87.6% fused silica solids by weight (dry basis), has a viscosity of between 40 and 50 seconds, and a film weight between 5 and 7 grams per standard six inch square plate. A suitable source of fused silica solids is −325 mesh fused silica flour. Both the ceramic slurry prewet and the ceramic slurry dipcoat may also include a suspending agent, a wetting agent, and a defoaming agent. Preferably, the suspending agent is polyvinyl chloride latex, the wetting agent is VICTAWET, and the defoaming agent is ethylhexanol. Table 4 sets forth the composition and specifications for an example of such a ceramic slurry dipcoat and ceramic slurry prewet suitable for use in the FIG. 4 embodiment of the present invention.

TABLE 4

| Composition: | |
|---|---|
| Dipcoat | |
| Aqueous Colloidal Silica | 12,800 ml |
| Latex | 740 ml |
| Ethylhexanol | 100 ml |
| VICTAWET | 560 ml |
| −325 Fused Silica Flour | 72 lb |
| Prewet | |
| Aqueous Colloidal Silica | 12,800 ml |
| Latex | 740 ml |
| Ethylhexanol | 100 ml |
| VICTAWET | 460 ml |
| −325 Fused Silica Flour | 36 lb |
| Specifications (Dipcoat) | |
| Viscosity = 40–50 sec. | |
| Film Wt. = 5–7 g. per 6 in. sq. plate | |
| 24.8% Colloidal SiO$_2$ Solids | |
| 75.2% Fused SiO$_2$ Solids | |
| 100% SiO$_2$ (Amorphous) | |
| Specification (Prewet) | |
| Viscosity = 6–8 Sec. | |
| 12.4% Colloidal SiO$_2$ Solids | |
| 87.6% Fused SiO$_2$ Solids | |
| 100% SiO$_2$ (Amorphous) | |

In accordance with the present invention, both the FIG. 1 and FIG. 4 embodiments thereof may be modified by using a special post-burn-out ceramic slurry for the dipping of the ceramic substrate after the burn out step. For purposes of the present invention this post-burn-out ceramic slurry may comprise zirconia and have a viscosity of between 1 and 20 seconds, preferably 5 seconds. A suitable source of zirconia is −325 mesh zirconia. Alternatively, the post-burn-out ceramic slurry may comprise alumina and have a viscosity of between 1 and 20 seconds, preferably 7 seconds. A suitable source of alumina is A-17 grade calcined alumina. For both the zirconia post-burn-out ceramic slurry and the alumina post-burn-out ceramic slurry it is preferable to also include a polyelectrolyte dispersing agent and a suspending agent. A preferred polyelectrolyte dispersing agent is DARVAN 7 and a preferred suspending agent is citric acid. DARVAN 7 is a trademarked polyelectrolyte dispersing agent supplied by the Specialties Department of R. T. Vanderbilt Company, Inc. Table 5 sets forth the specifications for DARVAN 7.

TABLE 5

Chemical Composition: A polyelectrolyte dispersing agent in aqueous solution.
Physical Form: Clear to slightly opalescent liquid.
Color: Water white.
Total Solids: 25±1%
Specific Gravity: 1.16±0.02.
pH: 9.5–10.5.
Viscosity: 75 cps maximum.

For purposes of the present invention the composition and compounding of an example of a zirconia post-burn-out ceramic slurry suitable for use in either the FIG. 1 or FIG. 4 embodiments of the present invention are set forth in Table 6 and the composition and compounding of an example of a alumina post-burn-out ceramic slurry (which contains A-17 GRADE CALCINED ALUMINA which has an ultimate crystal size between 3.0 and 3.5 μm and an aluminum content greater than 99.5%) suitable for use in either the FIG. 1 or FIG. 4 embodiment of the present invention are set forth in Table 7.

TABLE 6

100% Stabilized Zirconia Post-Burn-Out Ceramic Slurry

| Composition: | |
|---|---|
| −325 Zirconia | 3000 g |
| DARVAN 7 | 9 g |
| Distilled Water | 600 g |
| Citric Acid | 3 g |
| Compounding: | |
| Ball Mill 24 hours. If thixotropic add more citric acid and mill longer. Transfer to storage container and adjust viscosity to five (5) seconds prior to use. | |

TABLE 7

100% Alumina Post-Burn-Out Ceramic Slurry

| Composition: | |
|---|---|
| A-17 grade Calcined Alumina | 2000 g |
| Distilled H$_2$O | 320 g |
| DARVAN 7 | 2 g |
| Citric Acid | 1 g |
| Compounding: | |
| Ball Mill 24 hours, transfer to storage container and adjust viscosity to seven (7) seconds prior to use. | |

Ceramic foam filters and other ceramic porous bodies made by the above-described embodiments of the present invention are suitable for use with molten metals in general and molten superalloys in particular, thus overcoming the disadvantages associated with prior art ceramic foam filter which were not suitable for use with molten superalloys. The suitability of ceramic foam filters and other ceramic porous bodies of the present invention for use with superalloys is illustrated by the testing described in Example 1.

EXAMPLE 1

Figure 5:
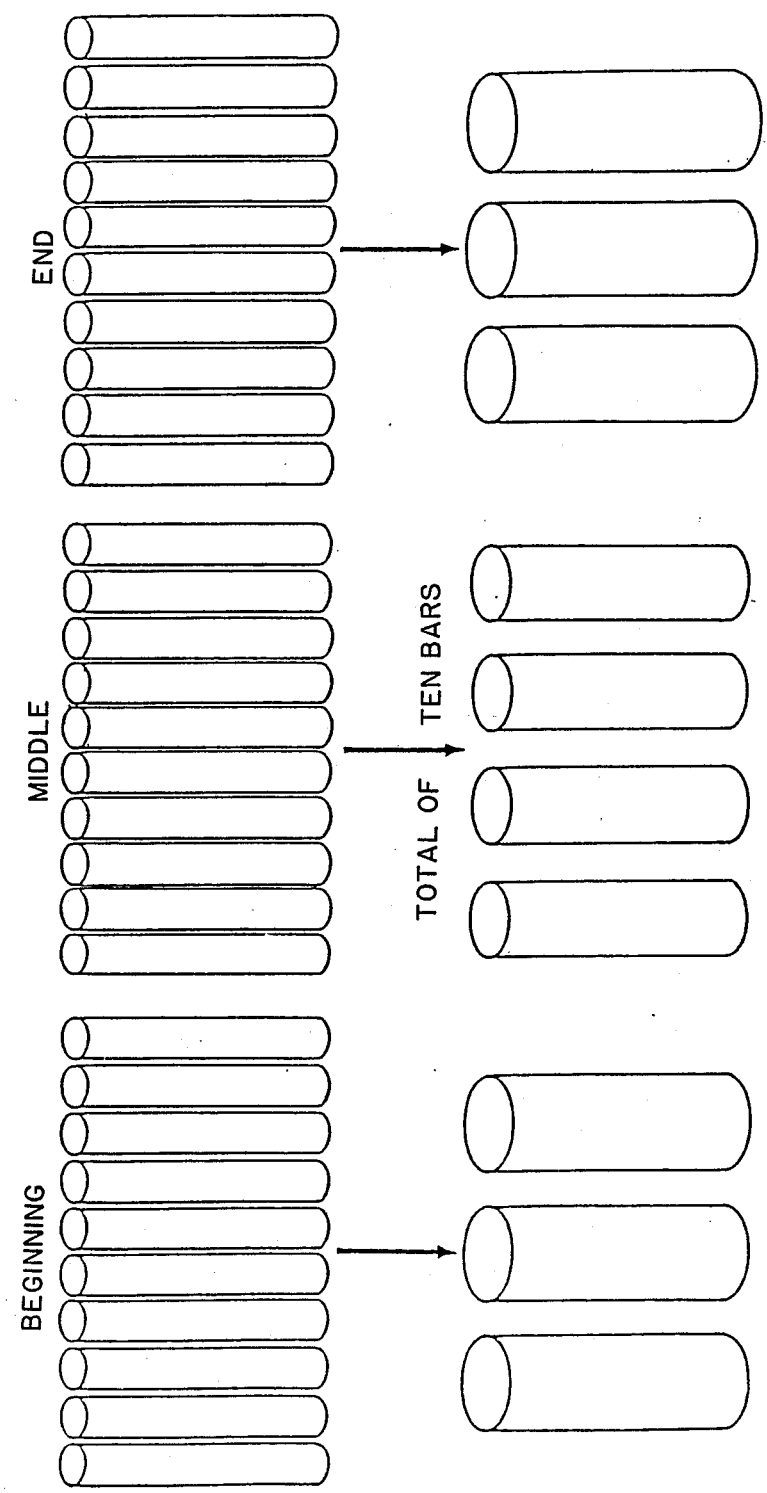
FIG. 5 is a diagram illustrating the selection of ingots from a poured heat to obtain beginning, middle, and end of pour samples.
Figure 6:
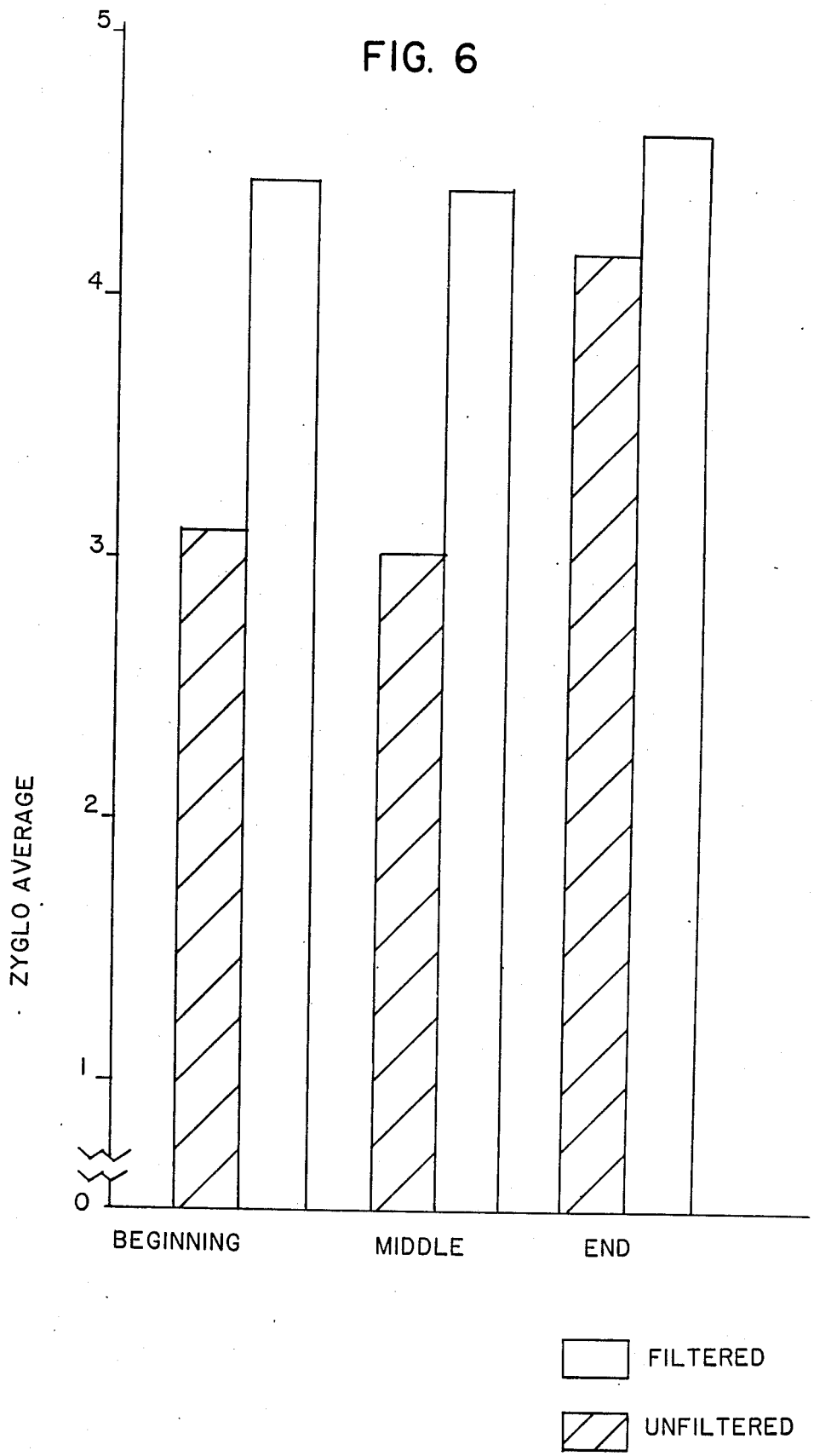
FIG. 6 is a graphic illustration of average zyglo ratings for the beginning, middle and end of pour locations of two heats of nickel-base superalloy poured through ceramic foam filters of the present invention.

In order to determine whether or not the ceramic foam filter of the present invention was deteriorating during the later part of a pour, tests were run to determine if any significant differences in zyglo quality existed between the beginning, middle, and end of filtered heats. Two heats of a nickel-base superalloy were poured without filters and two heats of a nickel-base superalloy were poured through ceramic foam filters made by the process illustrated in FIG. 4 using the ceramic slurry prewet and dipcoat described in Table 3. For the last three heats that were poured (2d unfiltered and both filtered), backfilling of the ingots was intentionally started earlier during the pour and the tapping block drained into two ingot tube molds. After completion of each pour, thirty ingots were color coated; ten each from the beginning, middle, and end of the pour. From original beginning of pour ingots, three were selected. From the ten middle of pour ingots, four were selected and from the end pour ingots, three were selected. This gave a total of ten 16 pound charges for each heat (see FIG. 5). The charges were visually inspected and spot hand ground as deemed necessary. The charges were then cast into parts. Each part was assigned a zyglo rating from 1 to 5, number 5 being the best rating. The zyglo results for the beginning, middle, and end of pour locations for the various heats are shown in FIG. 6. This data reveals that the end of pour ingots received improved zyglo results in comparison to the beginning or middle of pour locations. In view of the fact that there is an improvement in the quality at the end of the heat, it would seem logical to assume that the filter is not significantly deteriorating throughout the pour. (It should be noted that from historical data from controlled statistical experiments end of pour zyglo results tend to be better than the beginning or middle of pour heats with certain furnaces.)

Figure 7:
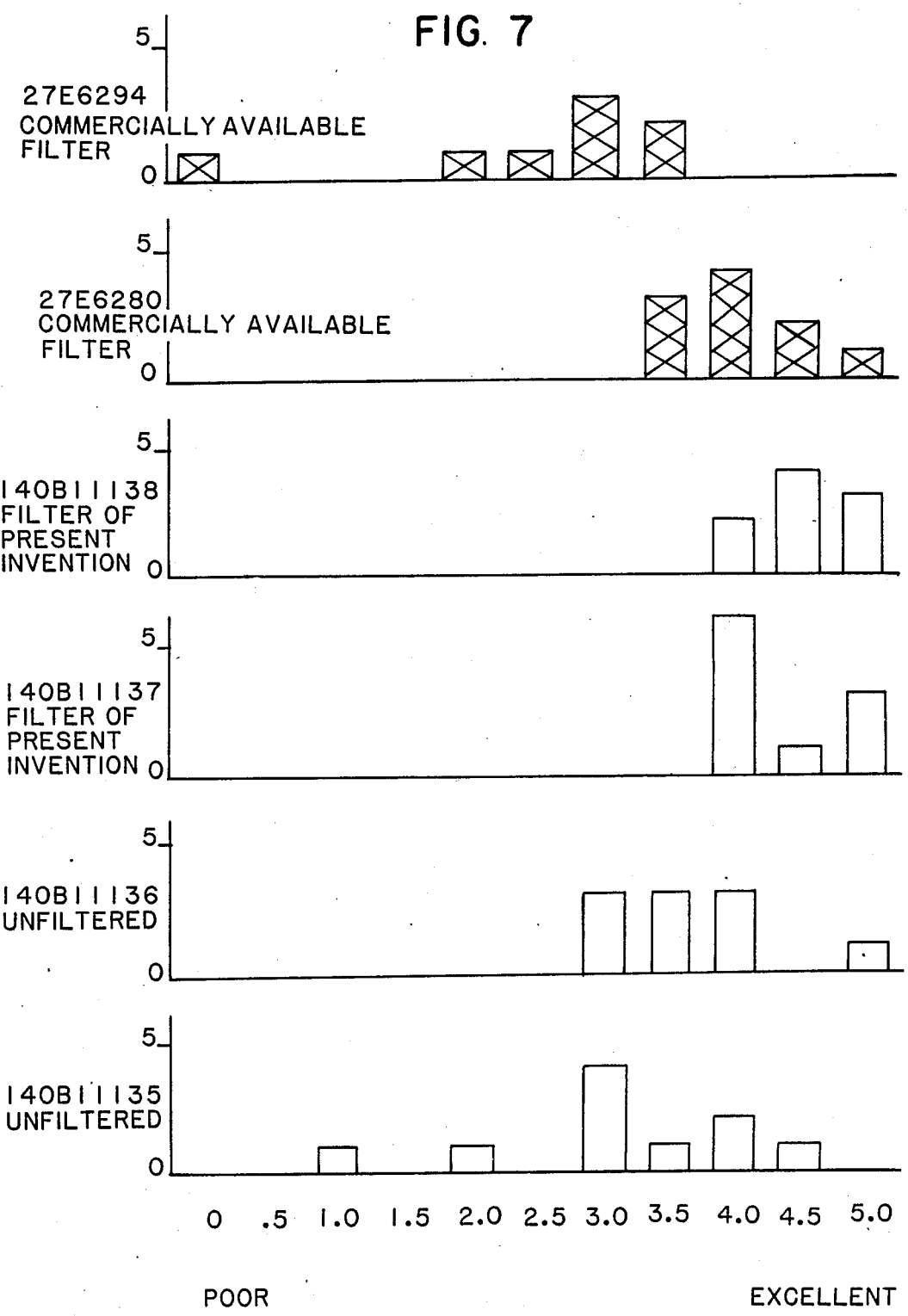
FIG. 7 is a graphic illustration of the frequency distribution of zyglo ratings for castings made from heats of alloys poured through ceramic foam filters of the present invention, castings made from heats of unfiltered alloys, and castings made from heats of alloys poured through commercially available filters.
Figure 8:
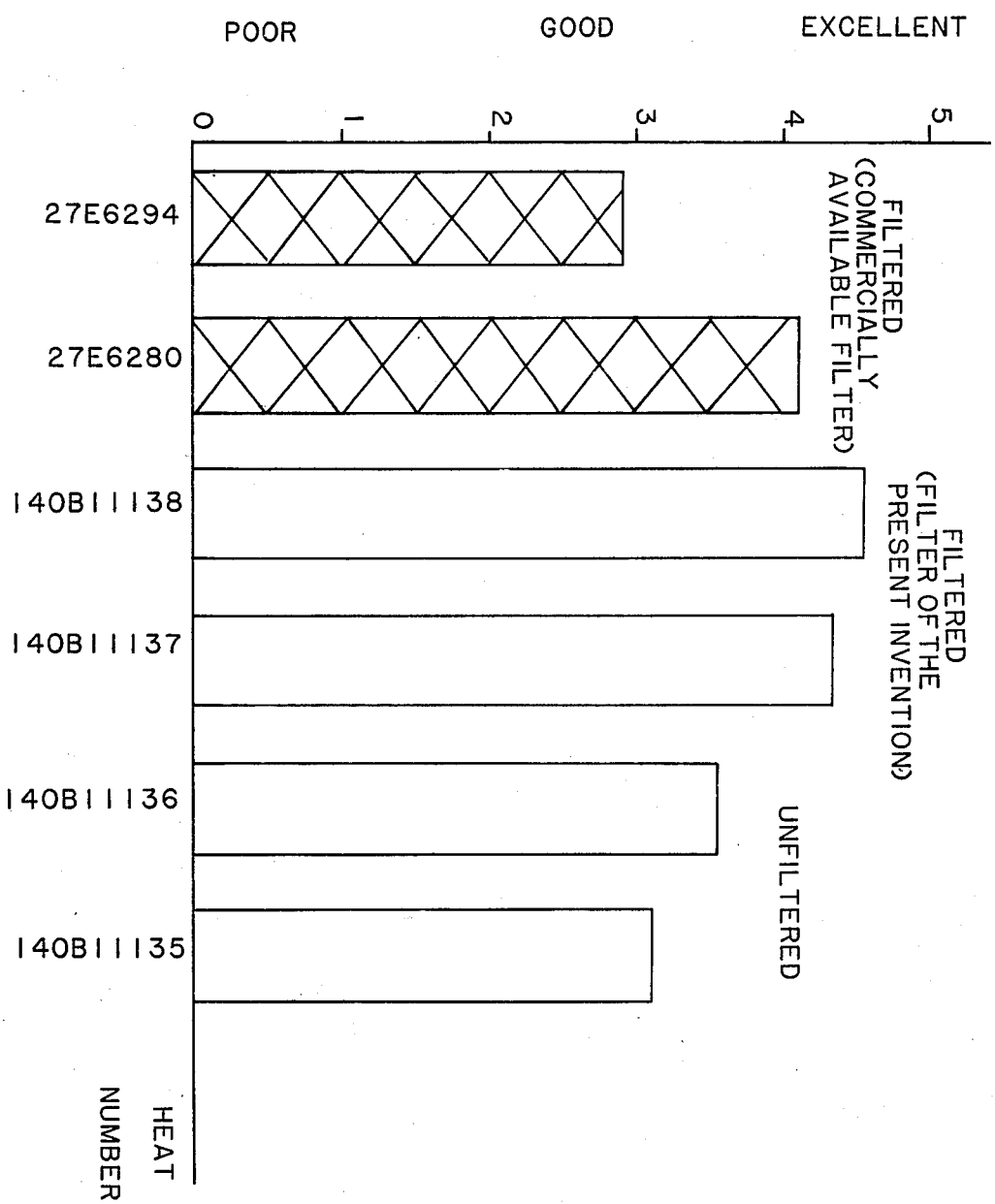
FIG. 8 is a graphic illustration of the overall average zyglo ratings for each heat of alloys poured through ceramic foam filters of the present invention, unfiltered alloys, and alloys poured through commercially available filters.

Testing of two heats of a nickel-base superalloy filtered with commercially available filters conducted simultaneously and by the same method as was used in the above-described testing showed that zyglo ratings of castings made from metal poured through ceramic foam filters of the present invention were superior to zyglo ratings of castings made from either the unfiltered metal or the metal filtered through commercially available filters. A frequency distribution showing the individual zyglo ratings for each heat is shown in FIG. 7. The two heats filtered with the ceramic foam filter of the present invention show a narrower distribution in comparison to either the heats filtered with commercially available filters or the unfiltered heats. The overall average zyglo ratings for each heat is shown in FIG. 8. The heats filtered through ceramic foam filters of the present invention received the superior zyglo ratings, followed by one or the heats filtered through the commercially available filter. Next in line were the two unfiltered heats and lastly the remaining heat filtered through the commercially available filter.

Figure 9:
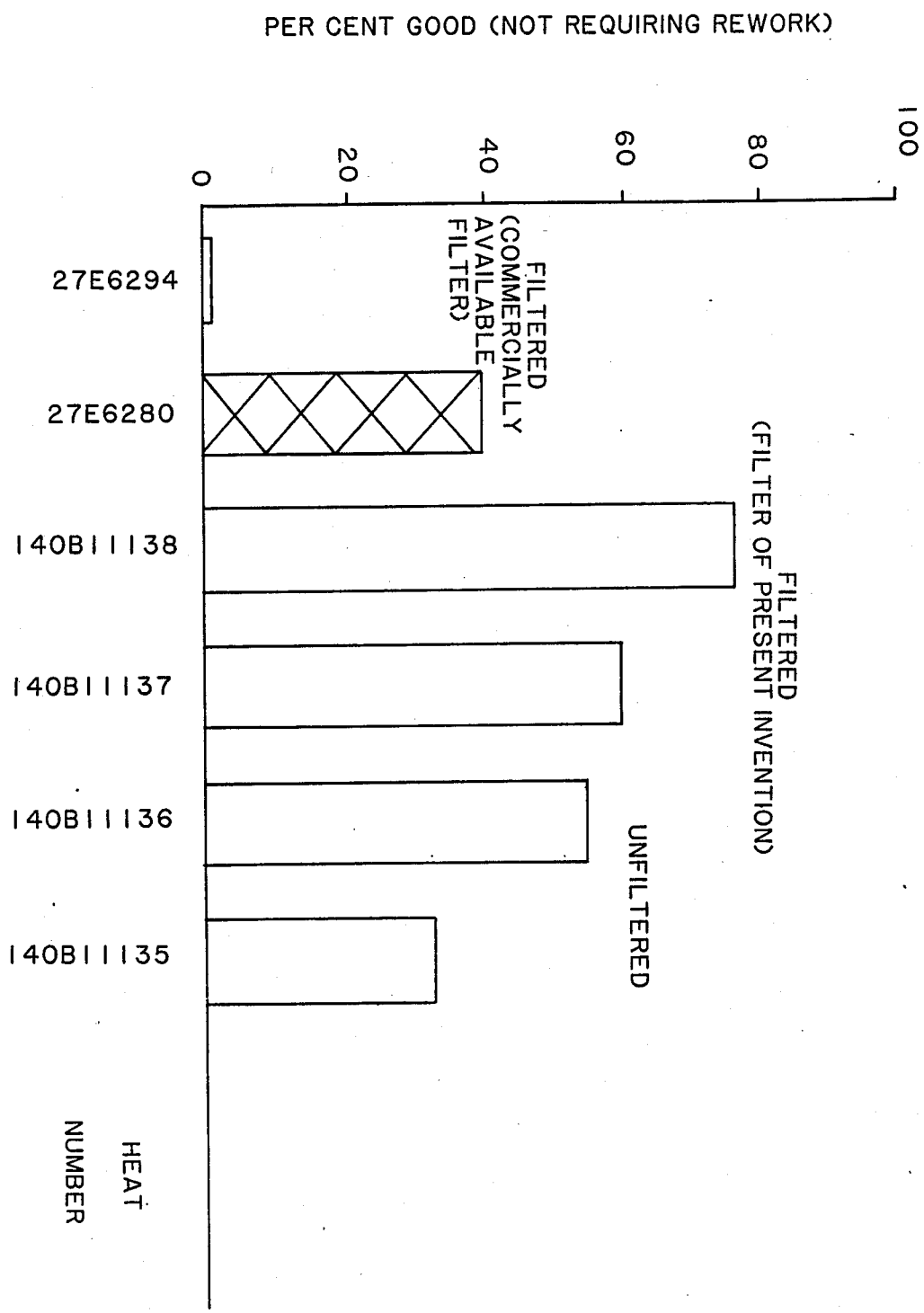
FIG. 9 is a graphic illustration of the percentage of castings not requiring reworking for each heat of alloys poured through ceramic foam filters of the present invention, unfiltered alloys, and alloys poured through commercially available filters.

After the castings were sent through normal production cycles and the final zyglo operation, they were classified as either rework or good. FIG. 9 shows the percentage of castings which did not require reworking. As can be seen, the castings made from metal poured through filters of the present invention had the highest percentage of castings which did not need reworking.

Final analysis of each of the heats tested is given in Table 8. Heats 140B11135 and 140B11136 were unfiltered. Heats 140B11137 and 140B11138 were poured through ceramic foam filters of the present invention (FIG. 4 embodiment; Table 3 prewet and dipcoat composition). Heats 27E6294 and 27E6280 were poured through commercially available filters.

TABLE 8

| Element | 140B11135 | 140B11136 | 140B11137 | 140B11138 | 27E6294 | 27E6280 |
|---|---|---|---|---|---|---|
| C | .09 | .081 | .09 | .09 | .086 | .080 |
| Si | .02 | .03 | .03 | .02 | .04 | .02 |
| Mn | .01 | .01 | .01 | .01 | .01 | .01 |
| Co | 9.22 | 9.16 | 9.16 | 9.22 | 9.00 | 9.01 |
| Ni | Bal | Bal | Bal | Bal | Bal | Bal |
| Cr | 12.41 | 12.52 | 12.56 | 12.43 | 12.71 | 12.64 |
| Fe | .10 | .08 | .06 | .09 | .06 | .06 |
| Mo | 1.84 | 1.87 | 1.87 | 1.88 | 1.92 | 1.82 |
| W | 4.10 | 4.13 | 4.11 | 4.11 | 4.25 | 4.21 |
| P | .001 | .002 | .002 | .003 | .002 | .002 |
| Ti | 3.97 | 4.00 | 3.97 | 4.03 | 3.94 | 4.00 |
| Al | 3.60 | 3.46 | 3.42 | 3.55 | 3.32 | 3.50 |
| Nb | .02 | .02 | .03 | .03 | .01 | .01 |
| Ta | 4.11 | 4.08 | 4.04 | 4.07 | 4.09 | 4.10 |
| V | .02 | .02 | .02 | .02 | .01 | .01 |
| B | 0.14 | .014 | .016 | .014 | .013 | .014 |
| S | .001 | .003 | .003 | .003 | .001 | .001 |
| Zr | .049 | .048 | .047 | .05 | .047 | .044 |
| Cu | .01 | .03 | .02 | .03 | .01 | .02 |
| Hf | .82 | .85 | .84 | .85 | .72 | .80 |
| Pb(ppm) | <.1 | <.1 | .1 | <.1 | .2 | .2 |
| Bi(ppm) | <.1 | <.1 | <.1 | <.1 | <.1 | <.1 |
| Ag(ppm) | <.1 | <.1 | <.1 | <.1 | <.1 | <.1 |
| Se(ppm) | <.5 | <.5 | <.5 | <.5 | <.5 | <.5 |
| Te(ppm) | <.1 | <.1 | <.1 | <.1 | <.1 | <.1 |
| Tl(ppm) | <.1 | <.1 | <.1 | <.1 | <.1 | <.1 |
| Mg(ppm) | 18/21 | 36/26 | 27/26 | 30/27 | 18 | 23 |
| N(ppm) | 9 | 7 | 5 | 9 | 8 | 18 |
| O(ppm) | 4 | 2 | 4 | 4 | 4 | 2 |
| Nv | 2.39 | 2.37 | 2.27 | 2.39 | 2.33 | 2.38 |

The ceramic foam filters of the present invention may be used in filtering a wide range of metals. Table 9 contains a list of superalloys which have been successfully filtered with ceramic foam filters of the present invention.

TABLE 9

| Alloy | "V" Number |
|---|---|
| Nickel Base - Pour Temperature 2700° F./2750° F. | |
| Hastelloy B | 150 |
| U-700 | 85 |
| Mar-M-200 + Hf | 132 |
| IN-738LC | 141 |
| IN-713C | 91 |
| IN-713LC | 66 |
| Waspalloy | 1 |
| B-1900 + Hf | 125 |
| B-1900 | 54 |
| Mar-M-247 | 195 |
| Rene 125 | 159 |
| Merl 76 | 217 |
| IN-100 | 62/67 |
| Rene 41 | 7 |
| Rene 80 | 101 |

TABLE 9-continued

| Alloy | "V" Number |
|---|---|
| GMR-235 | 4 |
| Monalloy | 200 |
| IN-792 + Hf | 140 |
| SEL-15 | 38 |
| IN-625 | 103 |
| Cobalt Base - Pour Temperature 2750° F./2800° F. | |
| X-40 | 122 |
| Mar-M-509 | 2 |
| ECY-768 | 178 |
| HS-31 | 12 |
| Mar-M-302 | 36 |
| Nickel-Iron - Pour Temperature 2750° F. | |
| IN-718C | 96 |
| Hastelloy X | 74 |

The ceramic foam filters of the present invention are also suitable for filtering metals having a melting point of less than 1200° C., e.g. aluminum and copper.

In accordance with the present invention, there is provided a method of filtering molten metals in general and molten superalloys in particular which comprises the steps of: providing a ceramic foam filter of the present invention; positioning the ceramic foam filter so that molten metal will pass through the ceramic foam filter when the metal is poured; and pouring the molten metal through the ceramic foam filter. The positioning step may be accomplished in a number of ways.

Figure 10:
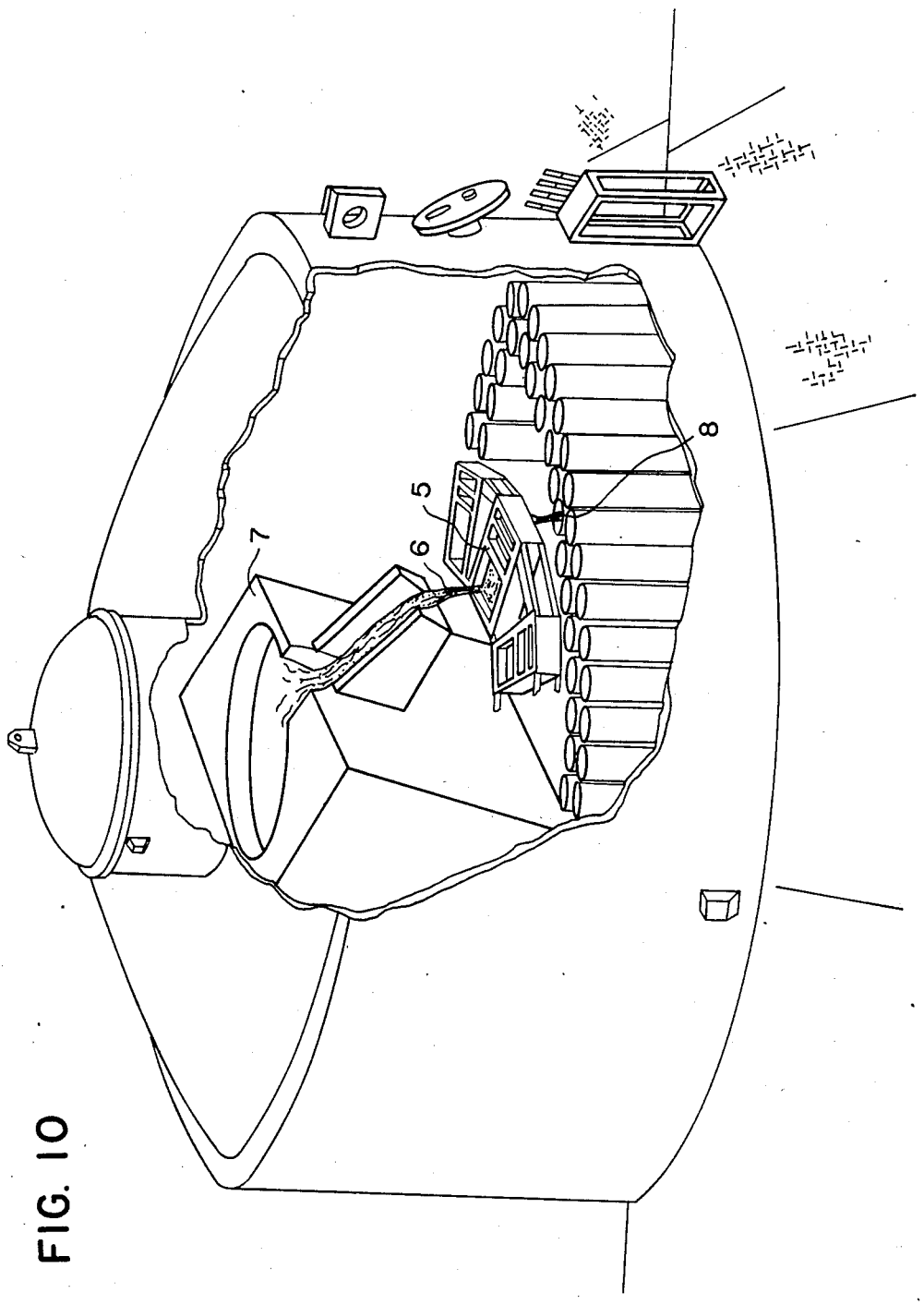
FIG. 10 is a perspective view in partial cut-away of an embodiment of the method of filtering molten metal of the present invention.

FIG. 10 illustrates a first embodiment of the above process wherein a ceramic foam filter of the present invention is positioned so that molten metal will pass through the ceramic foam filter an route from an alloy furnace to a mold. As embodied herein, the ceramic foam filter (not visible) is placed in a tundish (5) which is positioned to receive molten metal (6) from an alloy furnace (7). After passing through the tundish, the molten metal pours into a mold (8).

In accordance with the present invention there is provided a tundish, for use with a ceramic film filter to filter molten metal comprising a monolithic body having a bottom pour draining outlet and means for securing a ceramic foam filter in the path of molten metal passing through the tundish to the draining outlet.

Figure 11:
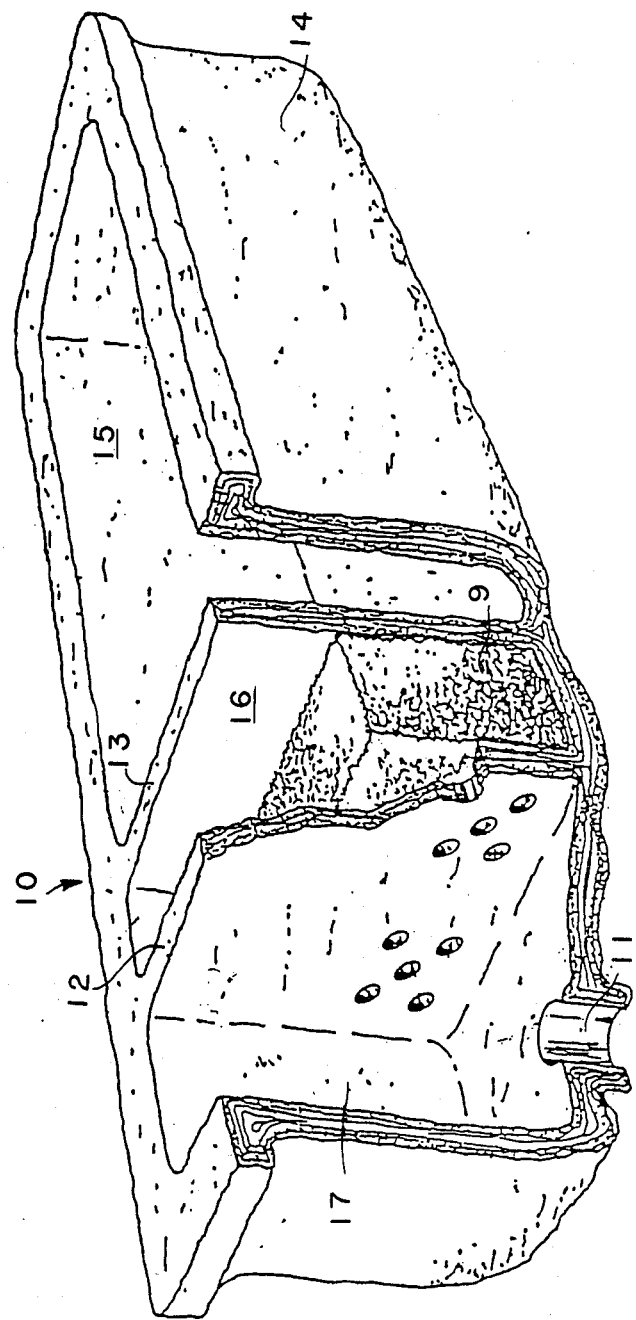
FIG. 11 is a perspective view in partial cut-away of an embodiment of the tundish of the present invention.

FIG. 11 illustrates a first embodiment of the tundish of the present invention. As embodied herein, the ceramic foam filter (9) is brick-shaped and the means for maintaining the ceramic foam filter in the path of molten metal (not shown) passing through the tundish (10) to the draining outlet (11) includes a pair of perforated walls (12, 13) which divide the tundish's monolithic body (14) into a molten metal receiving chamber (15), a molten metal filtering chamber (16), and a molten metal draining chamber (17), the draining outlet being located in the draining chamber. The filtering chamber which is located between the receiving chamber and the draining chamber is adapted to hold the brick-shaped ceramic foam filter between the perforated walls that separate the filtering chamber from the receiving chamber and the draining chamber.

In operation molten metal received in the receiving chamber, passes through the perforated wall separating the receiving chamber from the filtering chamber, then passes through the ceramic foam filter and is thereby filtered, then passes through the perforated wall separating the filtering chamber from the draining chamber, and finally drains from the tundish through the draining outlet in the bottom of the draining chamber.

Figure 12:
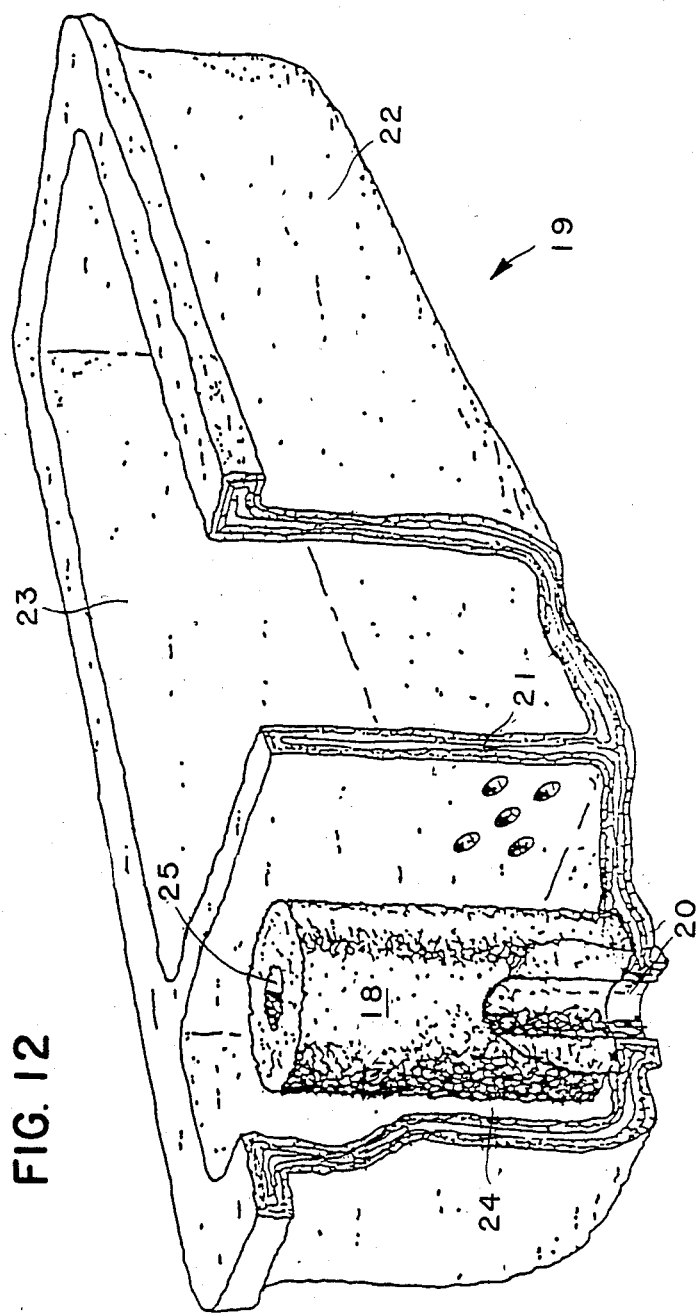
FIG. 12 is a perspective view in partial cut-away of another embodiment of the tundish of the present invention.

A second embodiment of the tundish of the present invention is illustrated in FIG. 12. As embodied herein, the ceramic foam filter (18) has the shape of a cylindrical tube and the means for maintaining the ceramic foam filter in the path of molten metal (not shown) passing through the tundish (19) to the draining outlet (20) includes a perforated wall (21) which divides the tundish's monolithic body (22) into a molten metal receiving chamber (23) and a molten metal filtering/draining chamber (24), the draining outlet being located in the filtering/draining chamber. The filtering/draining chamber is adapted to hold a ceramic foam filter in place directly over the internal diameter (25) of the draining outlet. In operation, molten metal is received in the receiving chamber, flows through the perforated wall separating the receiving chamber from the filering/draining chamber, then flows through the ceramic foam filter and is thereby filtered, and finally exits the tundish through the bottom-pour draining outlet.

Figure 13:
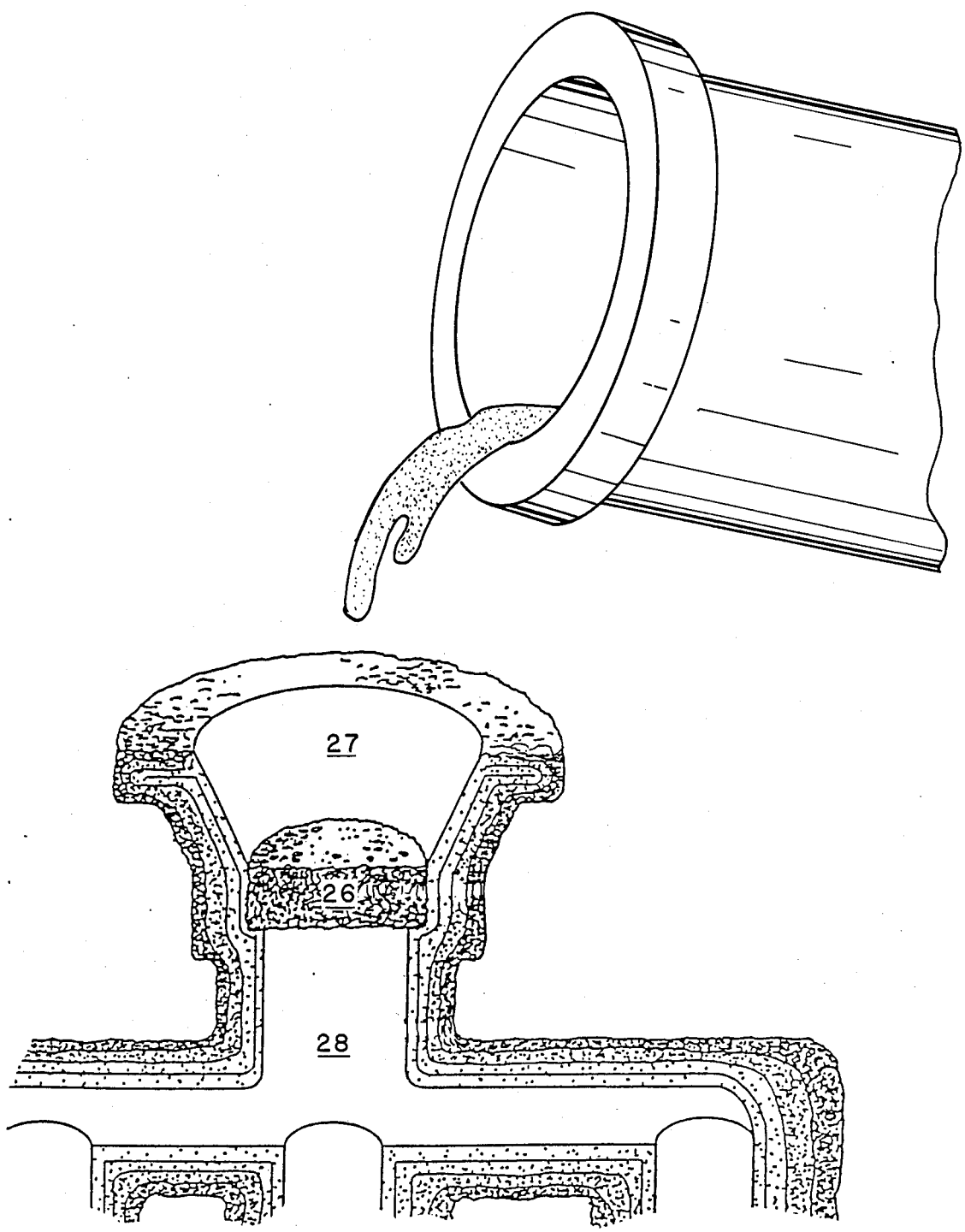
FIG. 13 is a perspective view in partial cut-away of another embodiment of a method of filtering metal of the present invention.
Figure 14:
FIG. 14 is a photograph of a ceramic foam filter of the present invention in the pouring cup of a casting mold before casting an alloy in accordance with an embodiment of the method of filtering molten metal of the present invention.
Figure 15:
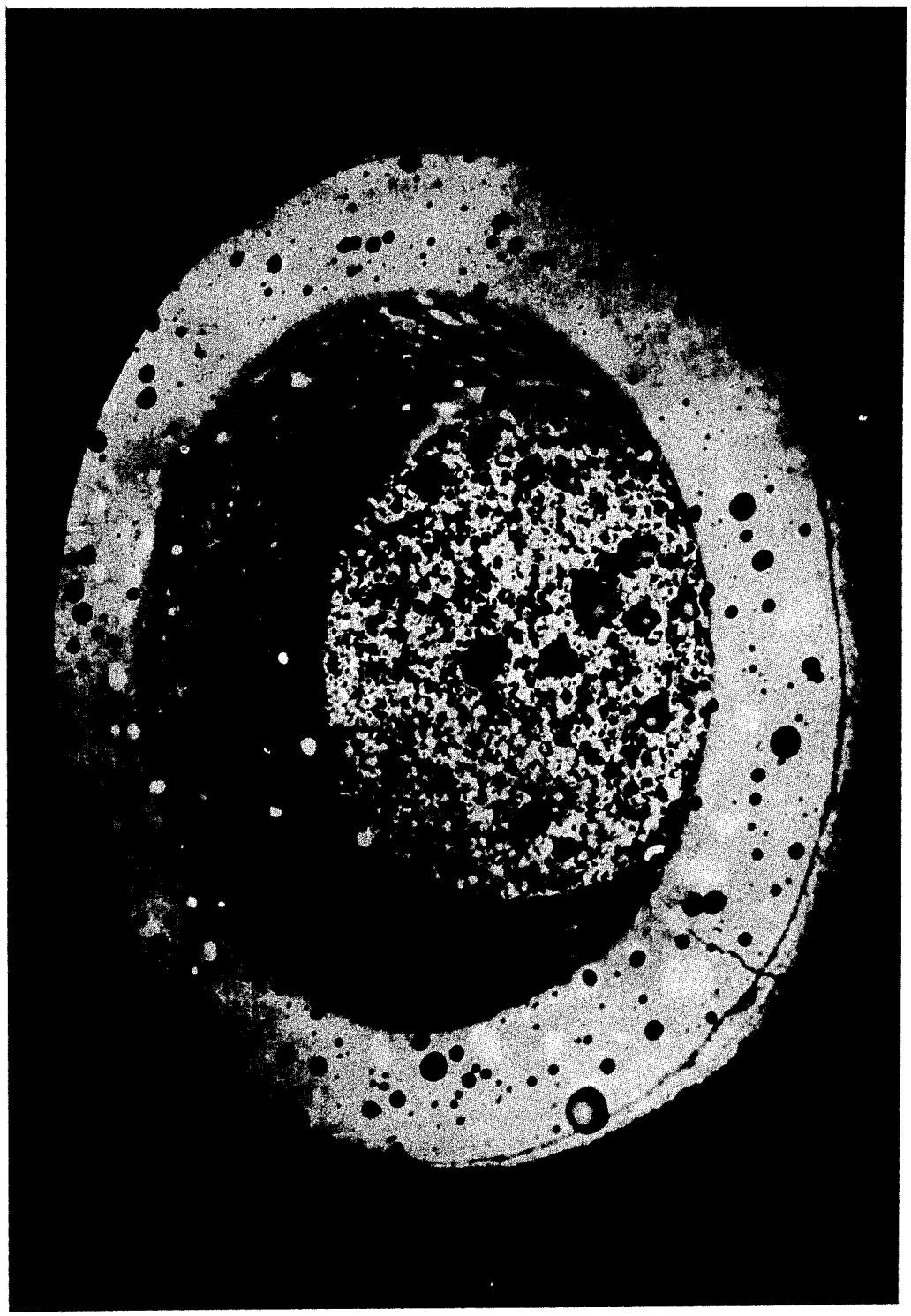
FIG. 15 is a photograph of a ceramic foam filter of the present invention in the pouring cup of a casting mold after casting an alloy in accordance with an embodiment of the method of filtering molten metal of the present invention.

In accordance with the present invention, FIG. 13 illustrates another embodiment of the method of filtering molten metal with the ceramic foam filter of the present invention wherein the ceramic foam filter is positioned so that molten metal will pass through the ceramic foam filter. As embodied herein, a ceramic foam filter (26) is placed in the neck or pouring cup (27) of a mold cavity (28). Good results have been obtained with a ceramic filter approximately 3 inches in diameter and 1 inch thick. In operation, the filter may be either preheated or at room temperature prior to pouring the molten alloy into the mold depending on the casting process used. The molten alloy is then poured onto and through the filter before entering the mold cavity. The resulting castings are substantially free of non-metallic inclusions. FIGS. 14 and 15 are photographs of actual molds with filters in their pouring cups—both before (FIG. 14) and after (FIG. 15) casting of an alloy. Different alloys, elements, and/or inclusions filter and/or react differently with different ceramic filter materials, e.g., alumina, zirconia, silica, and zircon. Generally, however, castings produced using the ceramic foam filters are of higher quality than castings produced without the ceramic foam filters.

Filtering molten metal with the ceramic foam filters of the present invention may also be accomplished by utilizing the ceramic foam filter as a bottom pour valve of a melting crucible. In accordance with the present invention there is provided a melting device for use in air or vacuum melting of an ingot of metal, which comprises a monolithic crucible having a bottom pour outlet and a ceramic foam filter adapted to be fitted into the bottom pour outlet. The length, the thickness, the diameter, the ceramic composition, and the pore size of the ceramic foam filter valve may be selected to control the flow of metal through the ceramic foam filter valve such that in operation an entire ingot of metal may be allowed to melt in the crucible before any metal begins pouring from the melting device.

Figure 16:
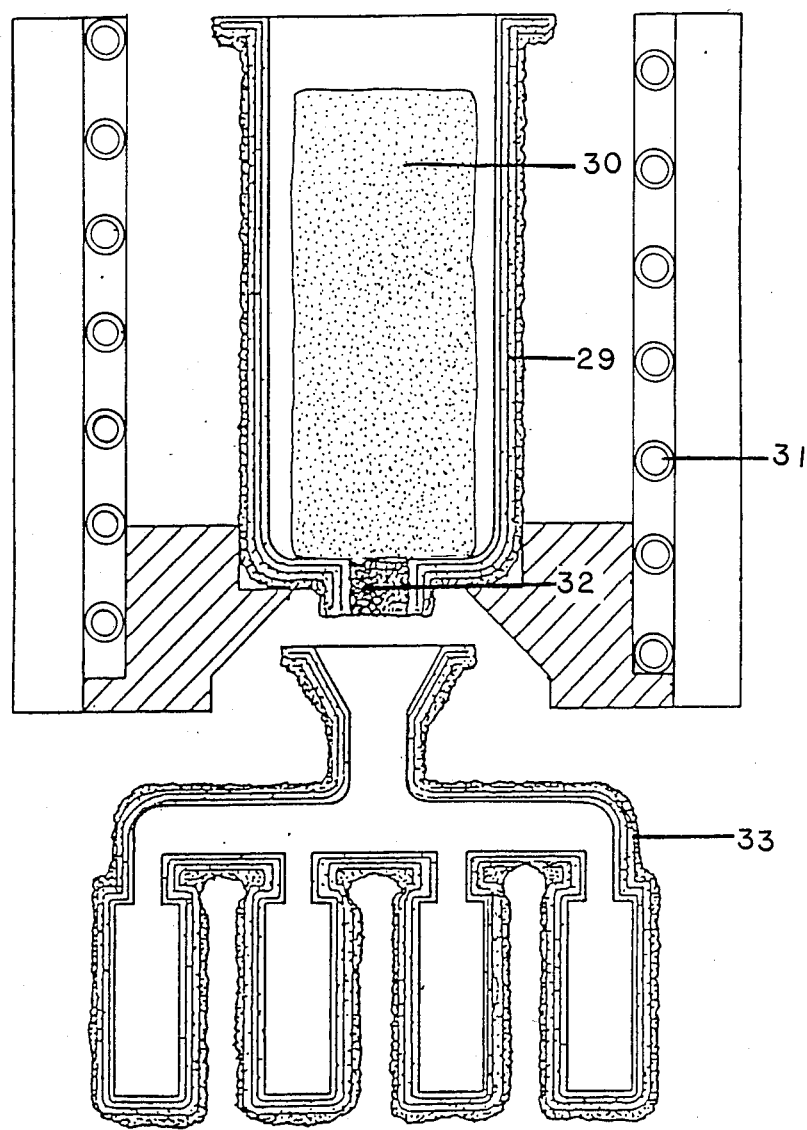
FIG. 16 is a cross-sectional view of an embodiment of a melting device of the present invention being used in a method of filtering molten metal in accordance with the present invention.

An embodiment of the above-described melting device is illustrated in FIG. 16. As embodied therein, a ceramic metal melting crucible (29) contains an ingot of metal (30) within an induction coil (31). Embedded in the bottom of the ceramic melting crucible is a ceramic foam filter (32). Beneath the ceramic foam filter is a casting mold (33). The melting device works as follows: the induction power is turned on, the metal charge is heated up to its pouring temperature as quickly as possible, the ceramic foam filter is heated by conduction from the molten metal and thereby lets molten metal pass through the filter and pour into the casting mold. Control of the passage of molten metal through the ceramic foam filter can be obtained by varying the length, diameter, mesh, thickness, or ceramic composition of the ceramic foam filter valve. In this manner, the passage of the molten metal through the ceramic foam filter valve can be controlled such that the entire ingot of metal is allowed to melt in the crucible before any of the metal begins pouring into the casting mold. This is a highly desirable achievement. In the practice of this invention ceramic foam filters have been varied in diameter from 1 inch to 3½ inches and in length from ¾ inch to 2½ inches with good results.

Figure 17:
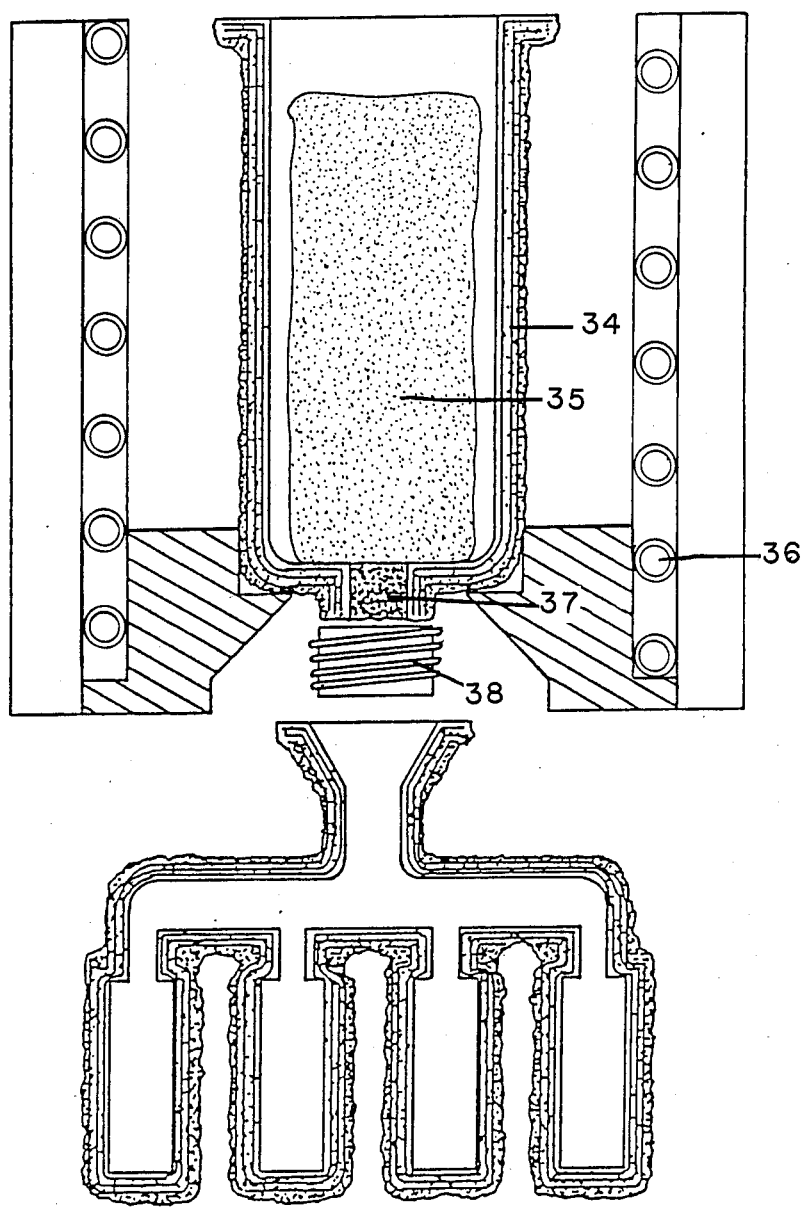
FIG. 17 is a cross-sectional view of another embodiment of a melting device of the present invention being used in a method of filtering molten metal in accordance with the present invention.

Preferably, passage of the metal through the ceramic foam filter valve is also controlled by supplemental heating and/or cooling of the ceramic foam filter area. This variation is illustrated in FIG. 17. As embodied therein, the ceramic metal melting crucible (34) contains an ingot of alloy (35) within an induction coil (36). A ceramic foam filter valve (37) is embedded in the bottom of the ceramic metal melting crucible. In addition, a heating or cooling source (38) is placed just beneath the ceramic foam filter valve. The heating or cooling source is then removed when the melting device is ready to pour.

Figure 18:
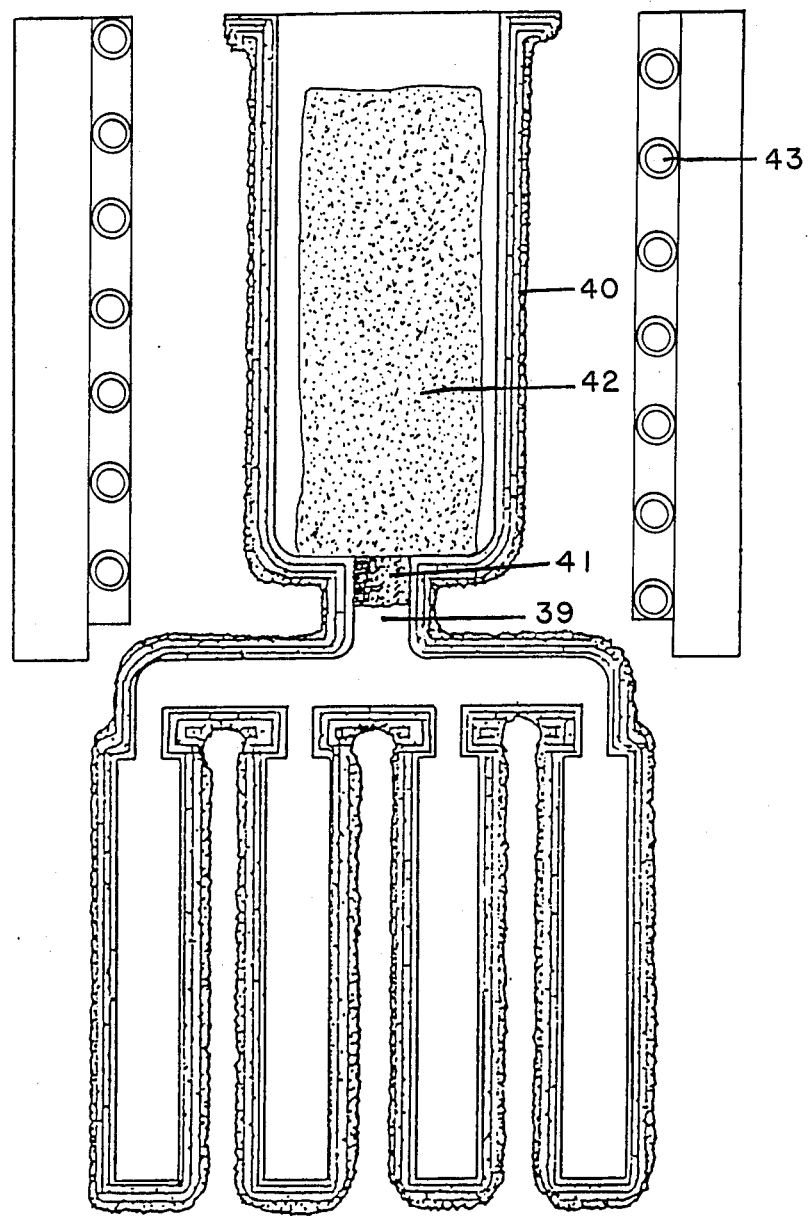
FIG. 18 is a cross-sectional view of another embodiment of a melting device of the present invention being used in a method of filtering molten metal in accordance with the present invention.
Figure 19:
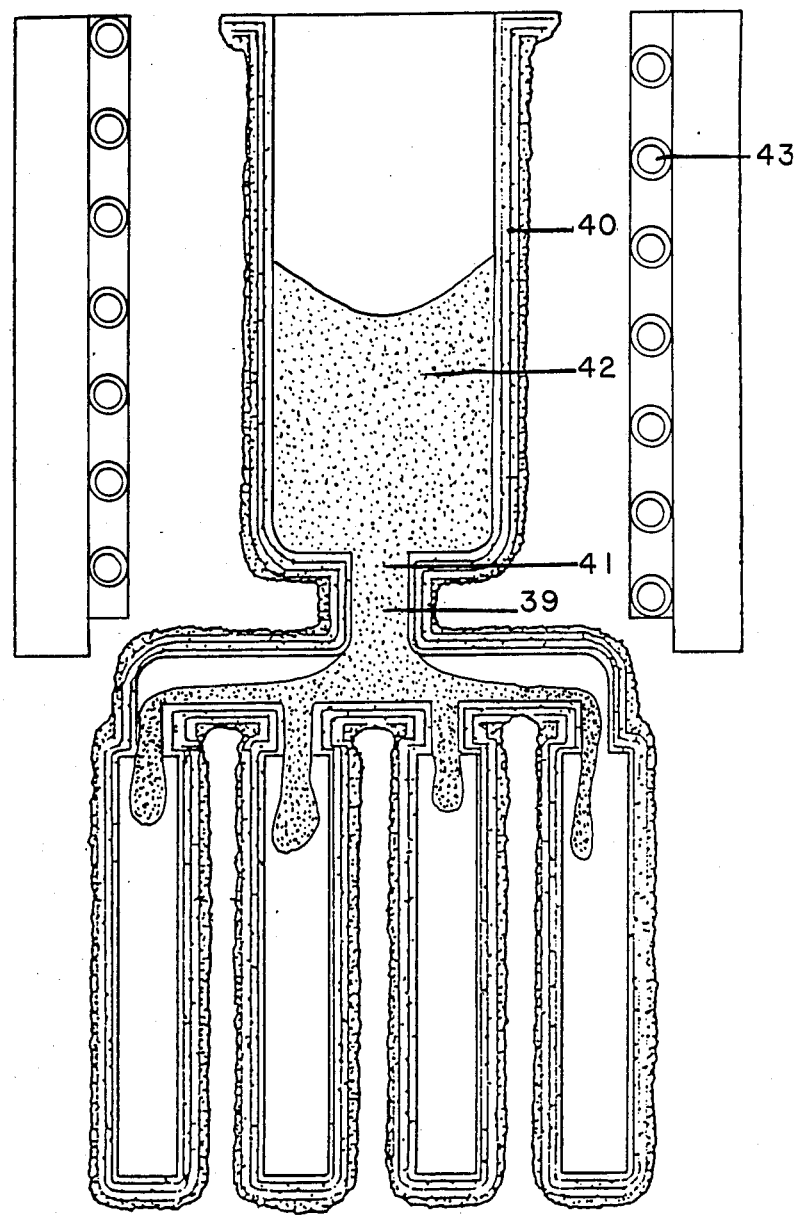
FIG. 19 is another cross-sectional view of the FIG. 18 embodiment of the melting device of the present invention depicting the filtering of molten metal in accordance with the present invention.

Another embodiment of the melting device of the present invention is illustrated in FIG. 18. As embodied herein, the neck of a casting mold (39) is produced with a melting crucible (40) containing a bottom pour ceramic foam filter valve (41) in place of a pouring cup. A metal charge (42) is placed in the crucible, and an induction coil (43) is placed around the crucible. The charge is heated as quickly as possible to the desired pour temperature and held until the ceramic foam filter valve heats up and allows the molten metal to flow through the filter and pour into the casting mold. FIG. 19 is another illustration of this embodiment depicting the pouring of the molten metal through the ceramic foam filter valve into the casting mold.

Figure 20:
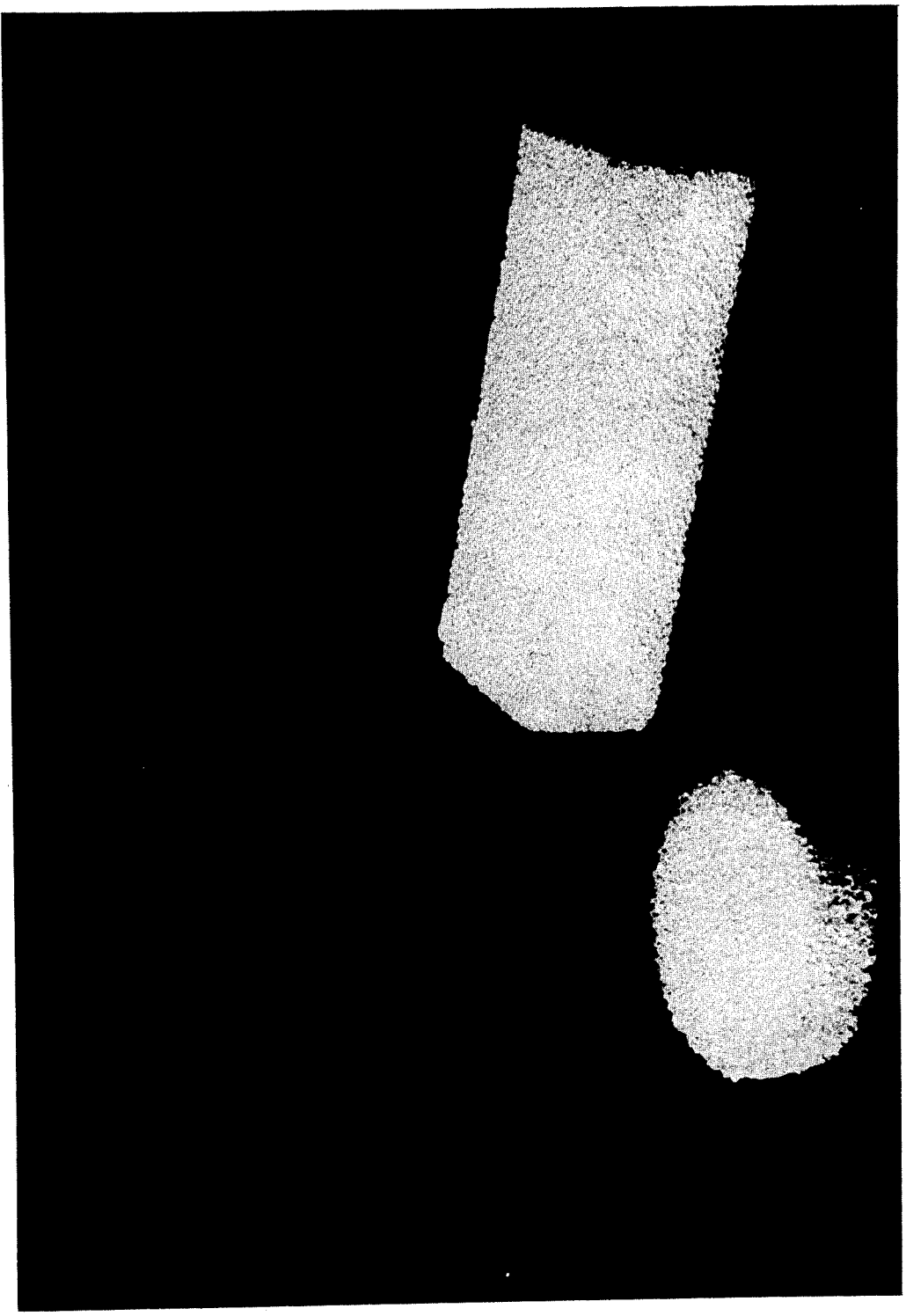
FIG. 20 is a photograph of two ceramic foam filters of the present invention.

For the purpose of the present invention, the ceramic foam filters may come in a wide variety of shapes and sizes. FIG. 20 is a photograph illustrating two shapes and sizes of ceramic foam filters of the present invention which have worked well in the filtering of molten metal.

In accordance with the present invention there is also provided a process for making a ceramic porous body suitable for use with molten metals in general and molten superalloys in particular having a solid, high density, smooth face which comprises the steps of: providing an open-cell, flexible, foam pattern and a face pattern the size and shape of a face of the foam pattern to be smoothed; coating the face pattern with a ceramic slurry; stuccoing the face pattern with a coarse ceramic material; impregnating the foam pattern with the ceramic slurry; placing the impregnated foam pattern on said coated, stuccoed face pattern such that the impregnated foam pattern and the coated, stuccoed face pattern dry together and become attached; impregnating the attached impregnated foam pattern and coated, stuccoed face pattern with additional ceramic slurry; removing excess dried ceramic down to the edges of foam pattern; burning out the foam pattern and the face pattern at a temperature of between 1400° F. and 2200° F. to form a ceramic substrate; impregnating the ceramic substrate with additional ceramic slurry; and firing the impregnated ceramic substrate at a temperature of between 2900° F. and 3350° F.

Figure 21:
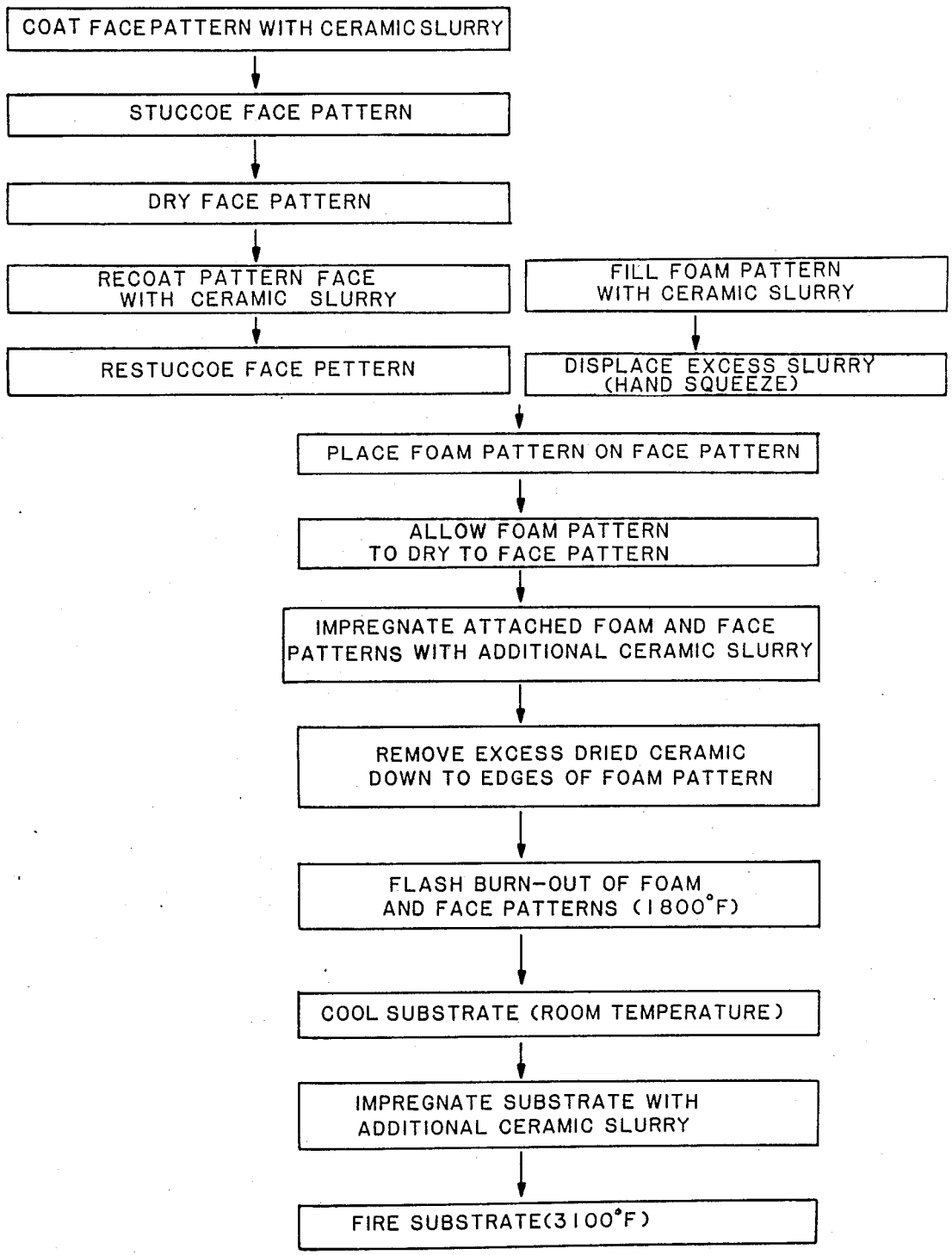
FIG. 21 is a schematic block diagram illustrating an embodiment of the process of making a smooth faced ceramic porous body of the present invention.

An embodiment of the process for making a solid, high density, high purity, smooth faced ceramic porous body in accordance with the present invention is illustrated in FIG. 21. As embodied herein, one starts with a face pattern the size and shape of the face of the ceramic article that is to be produced smooth and then coats the face pattern with a ceramic slurry. For purposes of the present invention a wide variety of materials may be used for the face pattern. Suitable materials include wax, plastic and graphite. Good results have been obtained with wax face patterns. The coated face pattern is then stuccoed to roughen its surface. Stuccoing may be accomplished by sprinkling a coarse ceramic material onto the wet, just-coated face pattern. A wide variety of ceramic materials may be used for the stuccoing step, e.g., alumina, silica, zirconia, zircon, or magnesia. It is best to select a ceramic material for stuccoing which will complement the ceramic composition of the ceramic slurry or slurries being used. The ceramic material for stuccoing should be coarse. Good results have been obtained with ceramic grains in the 70–120 mesh range. The preferred stuccoing material is 100 mesh alumina grain. After stuccoing the face pattern is dried. It is then recoated and restuccoed at the same time an open-cell, flexible, foam pattern for the article to be produced is first dipped. After the foam pattern is squeezed to remove excess slurry it is placed on the just-coated and stuccoed face pattern. The slurry on the foam pattern dries to the slurry on the face pattern causing them to become attached. From this point on the process is the same as it is for making a ceramic foam filter except that just prior to the burn-out step excess dried ceramic is removed down to the foam pattern's edge.

For purposes of the present invention, a single slurry system such as that illustrated in FIG. 1 may be used to make the smooth faced ceramic article. Table 2 sets forth slurry composition and specifications for an example of a ceramic slurry suitable for such a single slurry system. Alternatively, a ceramic slurry prewet and a ceramic slurry dipcoat may be used as is illustrated in FIG. 4. Examples of suitable ceramic slurry prewet and dipcoat combinations are set forth in Tables 3 and 4. Special post-burn-out ceramic slurries differing from the slurries used in the pre-burn-out steps may also be employed in making the smooth faced ceramic porous body of the present invention. Examples of such post-burn-out ceramic slurries are set forth in Tables 7 and 8.

Figure 22:
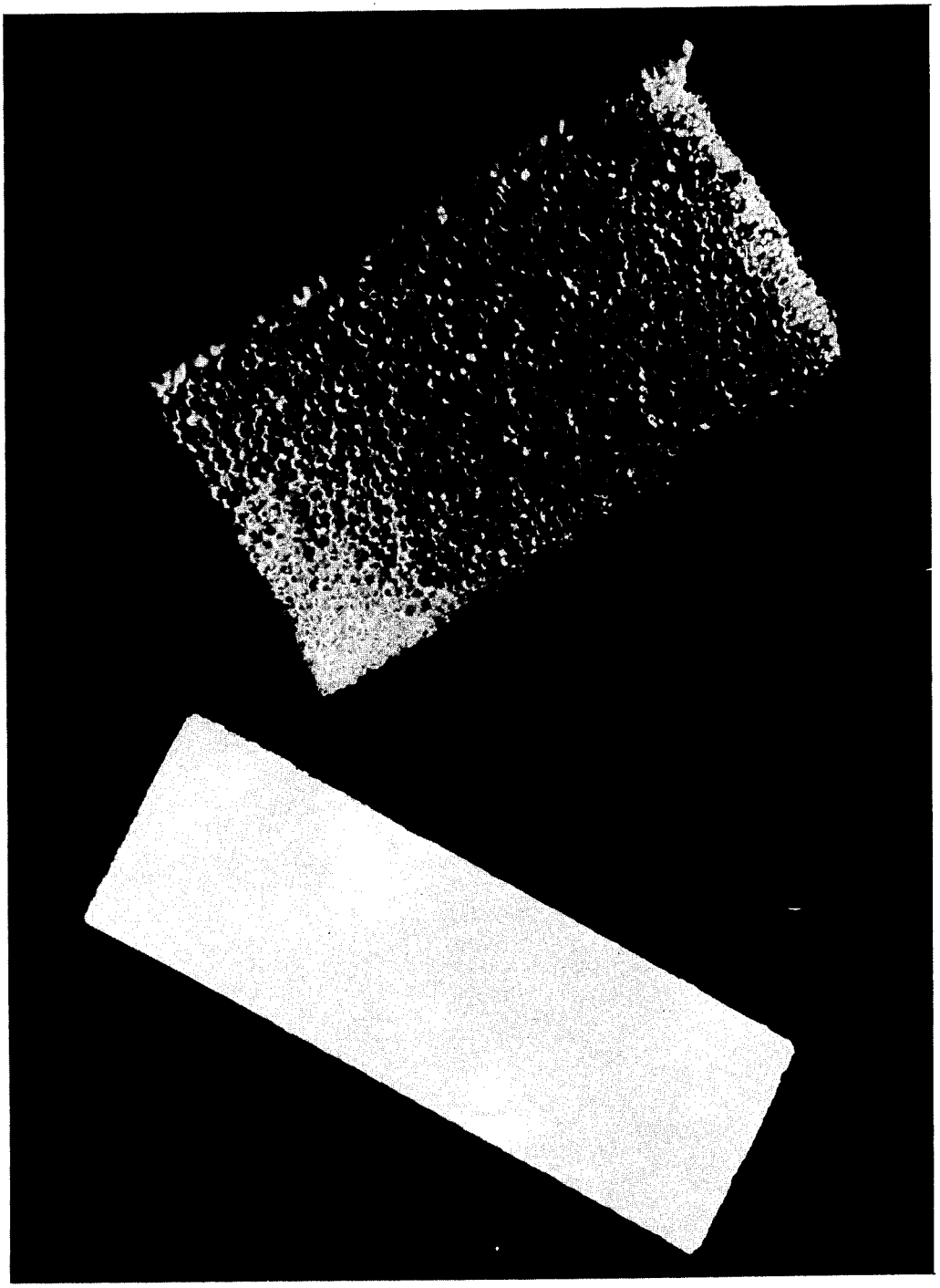
FIG. 22 is a photograph of a ceramic foam brick of the present invention.
Figure 23:
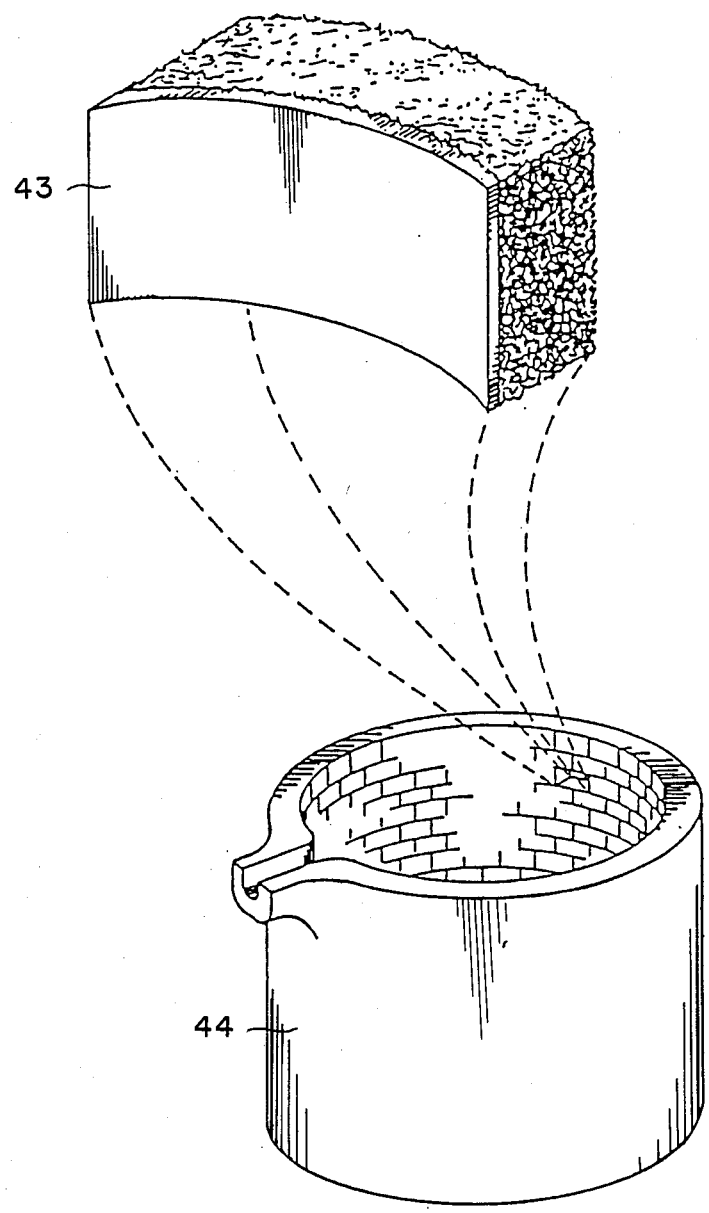
FIG. 23 is an exploded perspective view of a ceramic foam brick of the present invention being used as an insulating refractory lining for a ladle in accordance with the present invention.

There are many possible applications for the smooth faced ceramic porous bodies of the present invention. FIG. 22 is a photograph of a ceramic foam brick with a high density, high purity, smooth face. This article is suitable for use an insulating refractory lining for, inter alia, furnaces, kilns, or ladles. FIG. 23 illustrates the use of such a high density, high purity, smooth faced ceramic porous body (43) as an insulating refractory lining for a ladle (44).

Figure 24:
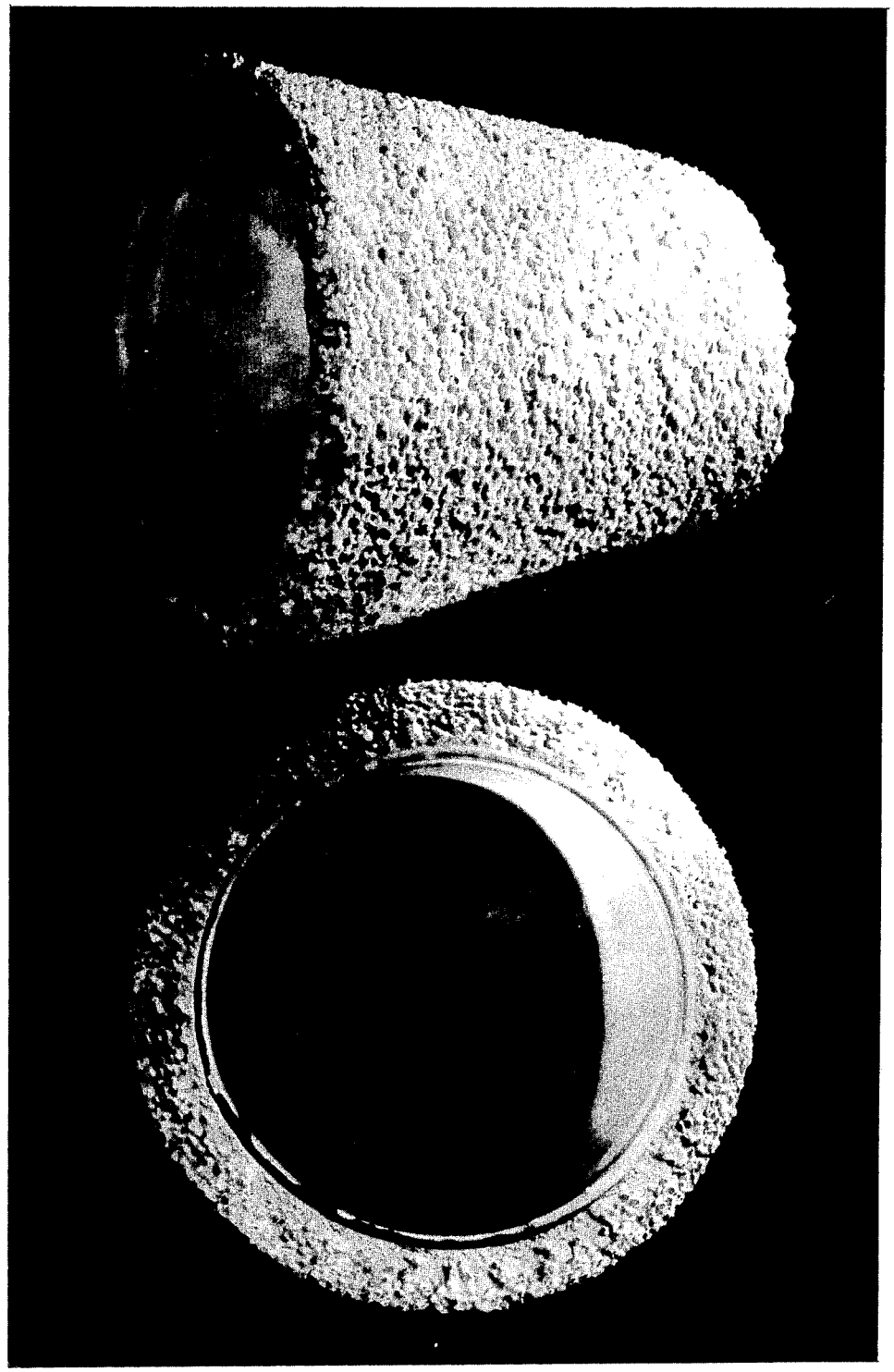
FIG. 24 is a photograph of an embodiment of a ceramic foam melting crucible of the present invention.
Figure 25:
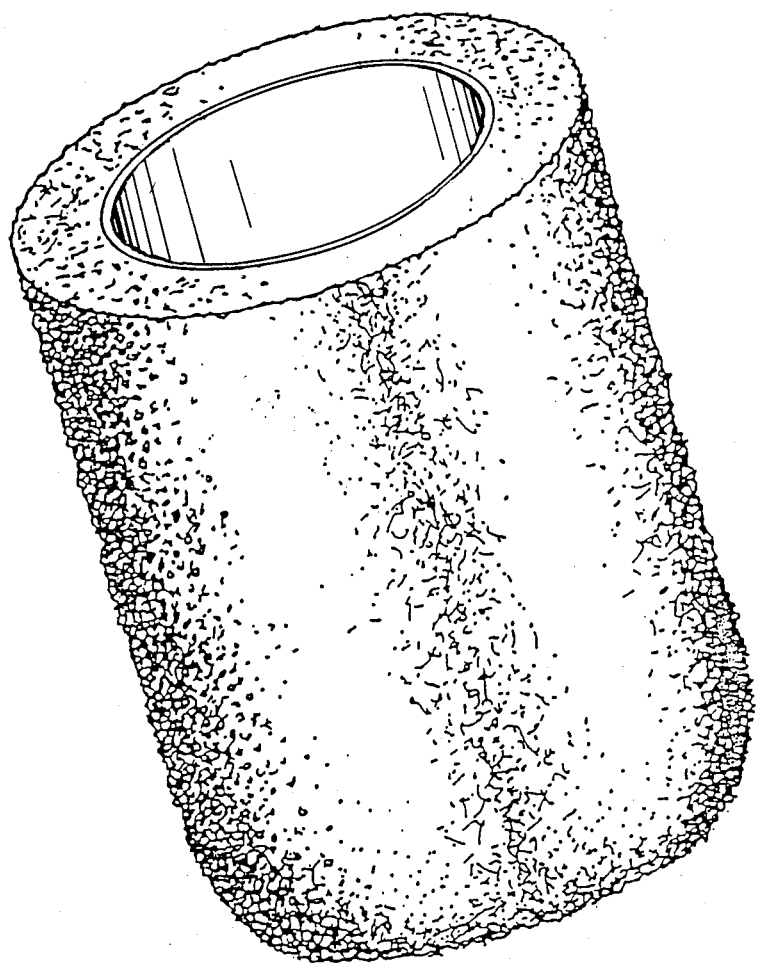
FIG. 25 is a perspective view of another embodiment of a ceramic foam melting crucible of the present invention.

The method for making a smooth faced ceramic body of the present invention may also be used to produce ceramic foam melting crucibles. FIG. 24 is a photograph of a ceramic foam melting crucible made in accordance with the present invention. FIG. 25 illustrates another embodiment of the ceramic foam melting crucible (45) of the present invention.

Figure 26:
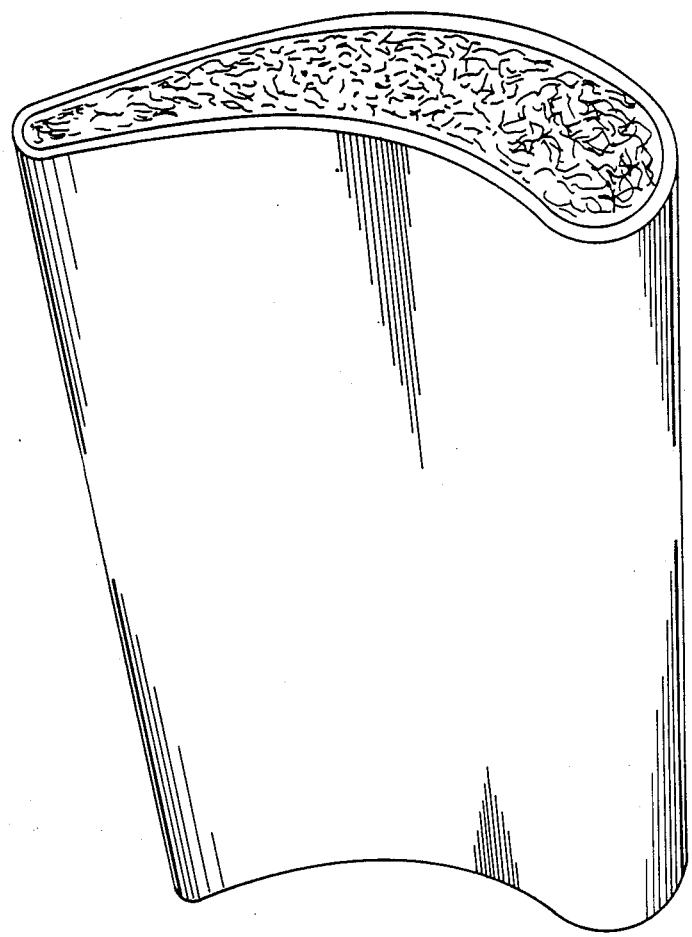
FIG. 26 is a perspective view of a ceramic foam core of the present invention.

The process of the present invention can also be used to make ceramic cores having a solid, high density, high purity, smooth exterior face. FIG. 26 illustrates an example of such a ceramic core (46).

As with the ceramic foam filters of the present invention, all of these smooth faced ceramic foam objects are suitable for use with molten metal in general and molten superalloys in particular.

It will be apparent to those skilled in the art that various modifications and variations can be made in the present invention without departing from the scope or spirit of the invention. Thus, it is intended that the present invention cover the modifications and variations of this invention provided that they come within the scope of the appended claims and their equivalents.

What is claimed is:

1. A process for making a ceramic foam filter suitable for use in filtering molten metals in general and molten superalloys in particular which comprises the steps of: providing an open-cell, flexible foam pattern; impregnating said foam pattern with a ceramic slurry; burning out said foam pattern at a temperature of between 1400° F. and 2200° F. to form a ceramic substrate; impregnating said ceramic substrate with additional ceramic slurry; and firing said impregnated ceramic substrate at a temperature of between 2200° F. and 3400° F.

2. The process of claim 1 wherein the temperature at which said polyurethane foam pattern is burned out is about 1800° F.

3. The process of claim 1 wherein the temperature at which said impregnated ceramic substrate is fired is about 3100° F.

4. The process of claim 1 wherein said open-cell, flexible foam pattern is a polyurethane foam.

5. The process of claim 1 wherein said polyurethane foam is a reticulated, fully open-pore, flexible, ester type, polyurethane foam having between 10 and 30 pores per inch.

6. The process of claim 1 wherein the step of impregnating said foam pattern with a ceramic slurry includes the steps of dipping said foam pattern into a ceramic slurry dipcoat, draining excess slurry from said pattern, drying said foam pattern, redipping said foam pattern into said ceramic slurry dipcoat, draining excess slurry from said foam pattern without squeezing, and drying said foam pattern; and the step of impregnating said ceramic substrate with additional ceramic slurry includes the steps of dipping said ceramic substrate into said ceramic slurry dipcoat, draining excess slurry from said ceramic substrate, and drying said ceramic substrate.

7. The process of claim 6 wherein said redipping, draining and drying of said foam pattern is repeated at least once.

8. The process of claim 6 wherein said ceramic slurry dipcoat has a composition of between 1% and 20% silica by weight (dry basis) and between 99% and 80% alumina by weight (dry basis), a viscosity of between 5 and 20 seconds, and a film weight of between 1.0 and 8.0 grams per standard six inch square plate.

9. The process of claim 8 wherein said ceramic slurry dipcoat comprises about 9.2% silica by weight (dry basis) and about 90.8% alumina by weight (dry basis), has a viscosity of between 10 and 13 seconds, and a film weight of between 3.7 and 4.0 grams per standard six inch square plate.

10. The process of claim 8 wherein said silica is aqueous colloidal silica and said alumina is −325 mesh alumina flour.

11. The process of claim 8 wherein said ceramic slurry dipcoat composition also includes a suspending agent, a wetting agent and a defoaming agent.

12. The process of claim 11 wherein said suspending agent is polyvinyl chloride latex, said wetting agent is an organic phosphate ester, and said defoaming agent is ethylhexanol.

13. The process of claim 1 wherein the step of impregnating said foam pattern with a ceramic slurry includes the step of dipping said foam pattern into a ceramic slurry prewet and a ceramic slurry dipcoat, and the step of impregnating said ceramic substrate with additional ceramic slurry includes the step of dipping said ceramic substrate into said ceramic slurry prewet.

14. The process of claim 13 wherein said step of dipping said foam pattern into a ceramic slurry prewet and a ceramic slurry dipcoat includes the steps of dipping said foam pattern into said ceramic slurry prewet, draining excess slurry from said foam pattern, dipping said foam pattern into said ceramic slurry dipcoat, draining excess slurry from said foam pattern, drying said foam pattern, redipping said foam pattern into said ceramic slurry prewet, draining excess slurry from said foam pattern without squeezing, redipping said foam pattern into said ceramic slurry dipcoat, draining excess slurry from said foam pattern without squeezing and drying said foam pattern, said redipping into prewet, draining, redipping into dipcoat, draining and drying steps being repeated at least once.

15. The process of claim 13 wherein said ceramic slurry dipcoat has a composition of between 1% and 20% silica by weight (dry basis) and between 99% and 80% alumina by weight (dry basis), a viscosity of between 5 and 60 seconds, and a film weight of between 1.0 and 8.0 grams per standard six inch square plate, and said ceramic slurry prewet has a composition of between 1% and 30% silica by weight (dry basis) and between 99% and 70% alumina by weight (dry basis), and a viscosity of between 1 and 25 seconds.

16. The process of claim 15 wherein said ceramic slurry dipcoat comprises about 9.2% silica by weight (dry basis) and about 90.8% alumina by weight (dry basis), has a viscosity of between 24 and 30 seconds, and a film weight of between 4.5 and 5.5 grams per standard six inch square plate, and said ceramic slurry prewet comprises about 11.9% silica by weight (dry basis) and about 88.1% alumina by weight (dry basis), and has a viscosity of between 8 and 10 seconds.

17. The process of claim 15 wherein said silica is aqueous colloidal silica and said alumina is −325 mesh alumina flour.

18. The process of claim 15 wherein said ceramic slurry dipcoat and said ceramic slurry prewet also include a suspending agent, a wetting agent and a defoaming agent.

19. The process of claim 18 wherein said suspending agent is polyvinyl chloride latex, said wetting agent is an organic phosphate ester, and said defoaming agent is ethylhexanol.

20. The process of claim 13 wherein said ceramic slurry dipcoat has a composition of between 1% and 20% colloidal silica solids by weight (dry basis) and between 99% and 80% fused silica solids by weight (dry basis), a viscosity of between 10 and 80 seconds, and a film weight of between 1 and 14 grams per standard six inch square plate, and said ceramic slurry preset has a composition of between 1% and 30% colloidal silica solids by weight (dry basis) and between 99% and 70% fused silica solids by weight (dry basis), and a viscosity of between 1 and 25 seconds.

21. The process of claim 20 wherein said ceramic slurry dipcoat comprises about 12.4% colloidal silica solids by weight (dry basis) and about 87.6% fused silica solids by weight (dry basis), has a viscosity of between 40 and 50 seconds, and a film weight of between 5 and 7 grams per standard six inch square plate, and said ceramic slurry prewet comprises about 24.8% colloidal silica solids by weight (dry basis) and about 75.2% fused silica solids by weight (dry basis), and has a viscosity of between 6 and 8 seconds.

22. The process of claim 20 wherein said fused silica solid is −325 mesh silica flour.

23. The process of claim 20 wherein said ceramic slurry dipcoat composition and said ceramic slurry prewet composition also include a suspending agent, a wetting agent and a defoaming agent.

24. The process of claim 23 wherein said suspending agent is polyvinyl chloride latex, said wetting agent is an organic phosphate ester, and said defoaming agent is ethylhexanol.

25. The process of claim 1 wherein the step of impregnating said ceramic substrate with additional ceramic slurry includes the steps of dipping said ceramic slurry into a post-burnout ceramic slurry dipcoat, draining excess slurry from said ceramic substrate, and drying said ceramic substrate, said post-burnout ceramic slurry dipcoat comprising zirconia and having a viscosity of between 1 and 20 seconds.

26. The process of claim 25 wherein said viscosity is about 5 seconds.

27. The process of claim 25 wherein said zirconia is −325 mesh zirconia.

28. The process of claim 25 wherein said post-burnout ceramic slurry dipcoat also includes a polyelectrolyte dispersing agent and a suspending agent.

29. The process of claim 28 wherein said suspending agent is citric acid.

30. The process of claim 1 wherein the step of impregnating said ceramic substrate with additional ceramic slurry includes the steps of dipping said ceramic slurry into a post-burnout ceramic slurry dipcoat, draining excess slurry from said ceramic substrate, and drying said ceramic substrate, said post-burnout ceramic slurry dipcoat comprising alumina and having a viscosity of between 1 and 20 seconds.

31. The process of claim 31 wherein said viscosity is about 7 seconds.

32. The process of claim 30 wherein said alumina has an ultimate crystal size of between 3.0 and 3.5 μm and an alumina content of greater than 99.5%.

33. The process of claim 30 wherein said post-burnout ceramic slurry dipcoat also includes a polyelectrolyte dispersing agent and a suspending agent.

34. The process of claim 33 wherein said suspending agent is citric acid.

35. A ceramic foam filter useful as a filtering material for molten metal in general and molten superalloys in particular made by the process of claim 1.

36. A ceramic foam filter useful as a filtering material for molten metal in general and molten superalloys in particular made by the process of claim 8.

37. A ceramic foam filter useful as a filtering material for molten metal in general and molten superalloys in particular made by the process of claim 15.

38. A ceramic foam filter useful as a filtering material for molten metal in general and molten superalloys in particular made by the process of claim 20.

39. A ceramic foam filter useful as a filtering material for molten metal in general and molten superalloys in particular made by the process of claim 25.

40. A ceramic foam filter useful as a filtering material for molten metal in general and molten superalloys in particular made by the process of claim 30.

41. A process for making a ceramic porous body suitable for use with molten metals in general and molten superalloys in particular having a solid, high density, high purity, smooth face which comprises the steps of: providing an open-cell, flexible, foam pattern and a face pattern the size of a face of said foam pattern to be smoothed; coating said face pattern with a ceramic slurry; stuccoing said face pattern with a coarse ceramic material; impregnating said foam pattern with said ceramic slurry; placing said impregnated foam pattern on said coated, stuccoed face pattern such that said impregnated foam pattern and said coated, stuccoed face pattern dry together and become attached; impregnating said attached impregnated foam pattern and coated, stuccoed face pattern with additional ceramic slurry; removing excess dried ceramic down to the edges of said foam pattern; burning out said foam pattern and said face pattern at a temperature of between 1400° F. and 2200° F. to form a ceramic substrate; impregnating said ceramic substrate with additional ceramic slurry; and firing said impregnated ceramic substrate at a temperature of between 2200° F. and 3400° F.

42. The process of claim 41 wherein the step of impregnating said attached impregnated foam pattern and coated stuccoed face pattern with additional ceramic slurry includes the steps of dipping said attached foam pattern and face pattern into a ceramic slurry dipcoat, draining excess slurry from said attached foam pattern and face pattern, drying said attached foam pattern and face pattern, redipping said attached foam pattern and face pattern into said ceramic slurry dipcoat, draining excess slurry from said attached foam pattern and face pattern without squeezing, and drying said attached foam pattern and face pattern; and the step of impregnating said ceramic substrate with additional ceramic slurry includes the steps of dipping said ceramic substrate into said ceramic slurry dipcoat, draining excess slurry from said ceramic substrate, and drying said ceramic substrate.

43. The method of claim 41 wherein said ceramic slurry dipcoat has a composition of between 1% and 20% silica by weight (dry basis) and between 99% and 80% alumina by weight (dry basis), a viscosity of between 5 and 20 seconds, and a film weight of between 1.0 and 8.0 grams per standard six inch square plate.

44. The method of claim 41 wherein the step of impregnating said attached impregnated foam pattern and coated, stuccoed face pattern with additional ceramic slurry includes the step of dipping said attached foam pattern and face pattern into a ceramic slurry prewet and a ceramic slurry dipcoat, and the step of impregnating said ceramic substrate with additional ceramic slurry includes the step of dipping said ceramic substrate into said ceramic slurry prewet.

45. The method of claim 44 wherein said ceramic slurry dipcoat has a composition of between 1% and 20% silica by weight (dry basis) and between 99% and 80% alumina by weight (dry basis), a viscosity of between 5 and 60 seconds, and a film weight of between 1.0 and 8.0 grams per standard six inch square plate, and said ceramic slurry prewet has a composition of between 1% and 30% silica by weight (dry basis) and between 99% and 70% alumina by weight (dry basis), and a viscosity of between 1 and 25 seconds.

46. The method of claim 44 wherein said ceramic slurry dipcoat has a composition of between 1% and 20% colloidal silica solids by weight (dry basis) and between 99% and 80% fused silica solids by weight (dry basis), a viscosity of between 10 and 80 seconds, and a film weight of between 1 and 14 grams per standard six inch square plate, and said ceramic slurry prewet has a composition of between 1% and 30% colloidal silica solids by weight (dry basis) and between 99% and 70% fused silica solids by weight (dry basis), and a viscosity of between 1 and 25 seconds.

47. The process of claim 41 wherein the step of impregnating said ceramic substrate with additional ceramic slurry includes the steps of dipping said ceramic slurry into a post-bur-out ceramic slurry dipcoat, draining excess slurry from said ceramic substrate, and drying said ceramic substrate, said post-burn-out ceramic slurry dipcoat comprising zirconia and having a viscosity of between 1 and 20 seconds.

48. The process of claim 41 wherein the step of impregnating said ceramic substrate with additional ceramic slurry includes the steps of dipping said ceramic slurry into a post-burn-out ceramic slurry dipcoat, draining excess slurry from said ceramic substrate, and drying said ceramic substrate, said post-burn-out ceramic slurry dipcoat comprising alumina and having a viscosity of between 1 and 20 seconds.

49. Insulating refractory lining for large metal melting furnaces and ladles suitable for use with molten metal in general and molten superalloys in particular comprising ceramic porous bodies made by the process of claim 41.

50. Insulating refractory lining for large metal melting furnaces and ladles suitable for use with molten metals in general and molten superalloys in particular comprising ceramic porous bodies made by the process of claim 43.

51. Insulating refractory lining for large metal melting furnaces and ladles suitable for use with molten metals in general and molten superalloys in particular comprising ceramic porous bodies made by the process of claim 45.

52. Insulating refractory lining for large metal melting furnaces and ladles suitable for use with molten metals in general and molten superalloys in particular comprising ceramic porous bodies made by the process of claim 46.

53. Insulating refractory lining for large metal melting furnaces and ladles suitable for use with molten metals in general and molten superalloys in particular comprising ceramic porous bodies made by the process of claim 47.

54. Insulating refractory lining for large metal melting furnaces and ladles suitable for use with molten metals in general and molten superalloys in particular comprising ceramic porous bodies made by the process of claim 48.

55. A melting crucible suitable for use with molten metals in general and molten superalloys in particular and having a solid, high density, high purity, smooth, internal face, comprising a ceramic porous body made from the method of claim 41.

56. A melting crucible suitable for use with molten metals in general and molten superalloys in particular and having a solid, high density, high purity, smooth, internal face, comprising a ceramic porous body made from the method of claim 43.

57. A melting crucible suitable for use with molten metals in general and molten superalloys in particular and having a solid, high density, high purity, smooth, internal face, comprising a ceramic porous body made from the method of claim 45.

58. A melting crucible suitable for use with molten metals in general and molten superalloys in particular and having a solid, high density, high purity, smooth, internal face, comprising a ceramic porous body made from the method of claim 46.

59. A melting crucible suitable for use with molten metals in general and molten superalloys in particular and having a solid, high density, high purity, smooth, internal face, comprising a ceramic porous body made from the method of claim 47.

60. A melting crucible suitable for use with molten metals in general and molten superalloys in particular and having a solid, high density, high purity, smooth, internal face, comprising a ceramic porous body made from the method of claim 48.

61. A ceramic core suitable for use with molten metals in general and molten superalloys in particular and having a solid, high density, high purity, smooth, exterior face, comprising a ceramic body made from the process of claim 41.

62. A ceramic core suitable for use with molten metals in general and molten superalloys in particular and having a solid, high density, high purity, smooth, exterior face, comprising a ceramic body made from the process of claim 43.

63. A ceramic core suitable for use with molten metals in general and molten superalloys in particular and having a solid, high density, high purity, smooth, exterior face, comprising a ceramic body made from the process of claim 45.

64. A ceramic core suitable for use with molten metals in general and molten superalloys in particular and having a solid, high density, high purity, smooth, exterior face, comprising a ceramic body made from the process of claim 46.

65. A ceramic core suitable for use with molten metals in general and molten superalloys in particular and having a solid, high density, high purity, smooth, exterior face, comprising a ceramic body made from the process of claim 47.

66. A ceramic core suitable for use with molten metals in general and molten superalloys in particular and having a solid, high density, high purrity, smooth, exterior face, comprising a ceramic body made from the process of claim 48.

* * * * *

UNITED STATES PATENT AND TRADEMARK OFFICE
CERTIFICATE OF CORRECTION

PATENT NO. : 4,697,632

DATED : October 6, 1987

INVENTOR(S) : NICK G. LIRONES

It is certified that error appears in the above-identified patent and that said Letters Patent is hereby corrected as shown below:

Column 18, claim 20, lines 66-67, delete "pre-set" and insert --prewet--.

Column 21, claim 47, line 21, delete "post-bur-out" and insert --post-burnout--.

Signed and Sealed this

Fifteenth Day of March, 1988

Attest:

DONALD J. QUIGG

Attesting Officer

Commissioner of Patents and Trademarks